United States Patent
Negishi

(10) Patent No.: US 6,183,080 B1
(45) Date of Patent: Feb. 6, 2001

(54) INTEGRAL VERTICAL PLANE ADJUSTING MECHANISM FOR AN EYEGLASS FRAME WITH MULTIFOCAL LENSES

(75) Inventor: Tohru Negishi, Saitama-ken (JP)

(73) Assignee: ELU Patent Optical Co., Ltd., Tokyo (JP)

(*) Notice: Under 35 U.S.C. 154(b), the term of this patent shall be extended for 0 days.

(21) Appl. No.: 09/590,411

(22) Filed: Jun. 8, 2000

Related U.S. Application Data

(63) Continuation-in-part of application No. 09/348,114, filed on Jul. 6, 1999, now abandoned.

(51) Int. Cl.[7] .................................. G02C 5/14; G02C 7/06
(52) U.S. Cl. .............................. 351/120; 351/55; 351/121
(58) Field of Search ................................. 351/119, 120, 351/121, 55

(56) References Cited

U.S. PATENT DOCUMENTS

| | | | |
|---|---|---|---|
| 3,947,100 | * 3/1976 | Vischer, Jr. | 351/120 |
| 4,280,758 | 7/1981 | Flader | 351/55 |
| 4,506,961 | 3/1985 | Palmieri | 351/137 |
| 4,547,048 | 10/1985 | Negishi | 351/137 |
| 4,991,952 | * 2/1991 | Grau | 351/120 |

FOREIGN PATENT DOCUMENTS 0 772 065 A1   7/1997   (EP).

* cited by examiner

*Primary Examiner*—Huy Mai
(74) *Attorney, Agent, or Firm*—Clifford W. Browning; Woodard, Emhardt, Naughton, Moriarty & McNett

(57) ABSTRACT

An eyeglass frame includes a pair of rims in which a corresponding pair of bifocal lenses are mounted, and a pair of temples connected to the respective rims. Each of the temples includes a joint secured to a corresponding one of the rims, a leg having one end connected to the joint and the other end resting behind a wearer's ear, and a mechanism for enabling pivotal movement between the joint and the leg in a vertical plane so as to permit movement of the bifocal lenses between a normal position and an elevated or reading position. The mechanism is so constructed as to decrease the distance between a first point at which the joint is connected to the rim and a second point at which the joint is connected to the leg when the lenses are moved from their normal to elevated position.

20 Claims, 29 Drawing Sheets

US 6,183,080 B1

INTEGRAL VERTICAL PLANE ADJUSTING MECHANISM FOR AN EYEGLASS FRAME WITH MULTIFOCAL LENSES

This is a continuation-in-part application of U.S. patent application Ser. No. 09/348,114 filed on Jul. 6, 1999 now abandoned.

BACKGROUND OF THE INVENTION

The present invention generally relates to eyeglasses with vertically adjustable multifocal lenses and more particularly, to a mechanism for providing vertical angle adjustability between the lenses and temples of eyeglasses.

One such mechanism is shown in U.S. Pat. No. 4,547,048 issued to Negishi, the inventor of the present application. In the patent to Negishi, each temple is composed of a joint secured to a rim in which a bifocal lens is mounted, a bend for resting behind the ear of a wearer, and a leg having one end unitarily connected to the bend and the other end pivotally connected to the joint. When the lenses are in a normal position, the joints and the legs are aligned in the longitudinal direction of the temples, with the lenses oriented substantially perpendicular to the temples. To move the lenses to an elevated or reading position, the joints together with the rims are downwardly pivoted or bent relative to the legs. At this time, the legs are slightly upwardly pivoted about the ears of the wearer. Simultaneously, a pair of nose pads are upwardly pivoted to accommodate inclination of the legs. A problem with this arrangement is that when the lenses are moved to their elevated position, the eyeglass frame is subjected to downward displacement. As this occurs, the plane of the eyeglass lenses becomes to be at an improper angle with respect to a line of sight therethrough.

Accordingly, it is an object of the present invention to provide a vertical plane adjusting mechanism adapted to be incorporated into an eyeglass frame and designed to permit two or more focal fields of lenses to be moved to the most comfortable and accurate position of use and also, firmly holding the eyeglass frame against the nose of a wearer when the eyeglass lenses are moved to an elevated position.

SUMMARY OF THE INVENTION

According to one aspect of the present invention, there is provided a vertical plane adjusting mechanism for an eyeglass frame with a pair of rims in which a pair of corresponding multifocal lenses are mounted. The adjusting mechanism includes a pair of temples, each of which is composed of a first piece having one end secured to a corresponding one of the rims, a second piece having one end connected to the other end of the first piece and the other end adapted to rest behind a wearer's ear, and means for enabling pivotal movement between the first and second pieces in a vertical plane so as to permit movement of the multifocal lenses between a normal position and an elevated position. As a feature, the means is so constructed as to decrease the distance between a first point at which the first piece is connected to the rim and a second point at which the first piece is connected to the second piece when the lenses are moved from their normal to elevated position. With this feature, the rims are firmly held against the face or nose of the wearer so that the plane of the eyeglass lenses are at a proper angle with respect to a line of sight therethrough.

In a preferred embodiment, the first piece includes a movable magnet, and the second piece includes a lower fixed magnet and an upper fixed magnet. The movable magnet of the first piece is magnetically attached to the lower magnet of the second piece when the lenses are held in their normal position. The movable magnet is magnetically attached to the upper magnet when the lenses are moved to their elevated position. Alternatively, the first piece may include upper and lower fixed magnets and the second piece may include a movable magnet.

In a preferred embodiment, the first piece of the temple has an elongated slot, and the second piece has a pin movable within the elongated slot when the lenses are moved between their normal and elevated positions. The first piece has a projection, and the second piece includes upper and lower recesses with the upper recess having a depth greater than that of the lower recess. The first piece further includes an extendable element inserted between the pin and one end of the elongated slot. The extendable element is so compressed as to hold the projection in the lower recess when the lenses are held in their normal position. The extendable element is so extended as to move the first piece toward the second piece when the lenses are moved from their normal to elevated position. The extendable element may be in the form of a coil spring or a bellows filled with gas or liquid.

According to another aspect of the present invention, there is provided an eyeglass frame for multifocal lenses, which includes a pair of rims adapted to mount the respective multifocal lenses therein, and a pair of temples connected to the respective rims. Each of the temples is composed of a first piece having one end secured to a corresponding one of the rims, a second piece having one end connected to the other end of the first piece and the other end adapted to rest behind a wearer's ear, and means for enabling pivotal movement between the first and second pieces in a vertical plane so as to permit movement of the multifocal lenses between a normal position and an elevated position. As a feature, the means is so constructed as to decrease the distance between a first point at which the first piece is connected to the rim and a second point at which the first piece is connected to the second piece when the lenses are moved from their normal to elevated position.

In one embodiment, the first element is a joint and the second element is a leg. In another embodiment, the first element is a leg, and the second element is a bend.

The above and other objects, features and advantages of the present invention will be apparent from the following description of preferred embodiments when taken in conjunction with the accompanying drawings.

DETAILED DESCRIPTION OF THE INVENTION

Figure 1:
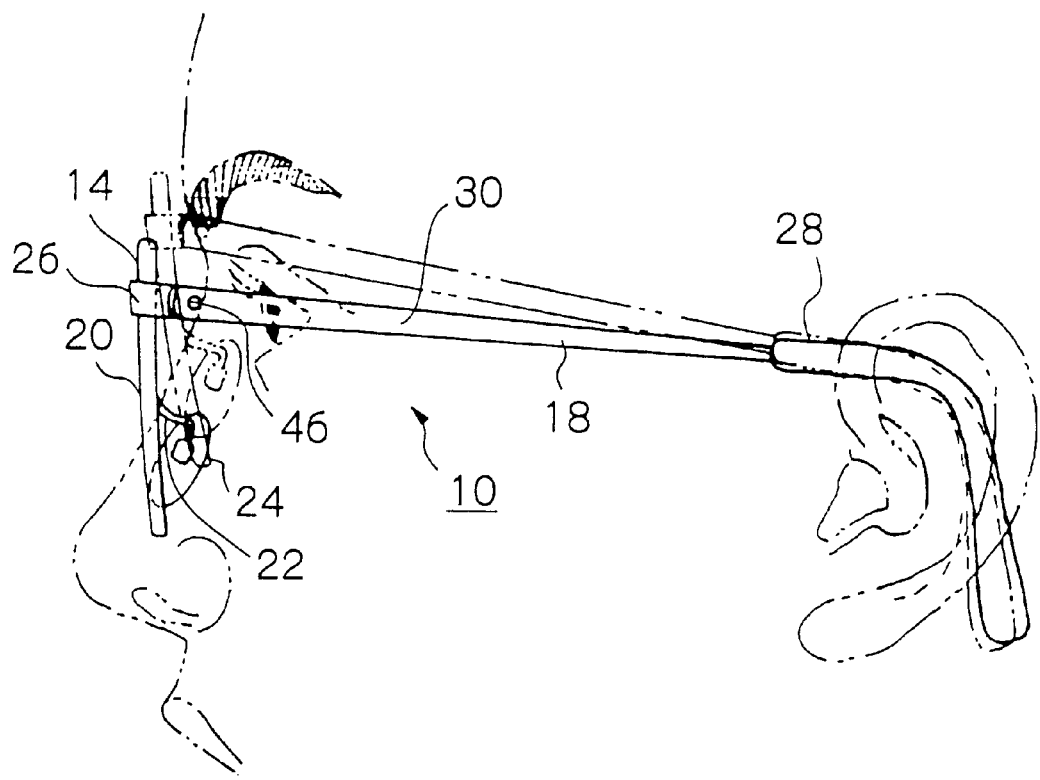
FIG. 1 is a side view of an eyeglass frame with bifocal lenses with the lenses in their normal position shown by solid line and with the lenses in their reading position shown by broken line.
Figure 2:
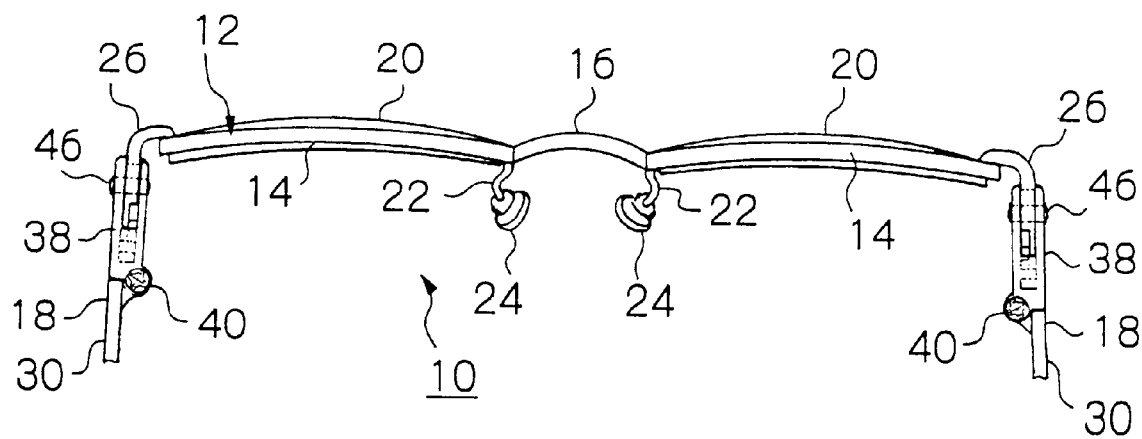
FIG. 2 is a top plan view, in part, of the eyeglass frame with a vertical plane adjusting mechanism made according to a first embodiment of the present invention.

Referring to FIGS. 1 and 2, there are shown a pair of eyeglasses generally designated at 10. The eyeglasses 10 generally include a frame 12 composed of a pair of rims 14 joined by a bridge 16 and a pair of temples 18 supported on the rims 14, and a pair of bifocal lenses 20 mounted in the rims 14 and having distance and reading segments at their upper and lower ends, respectively. A pair of pad arms 22 extend rearwardly from the nasal side of the rims 14. A pair of corresponding nose pads 24 are rockably mounted on the pad arms 22.

As an important feature of the present invention, a vertical plane adjusting mechanism is provided to permit the two focal fields of the lenses 20 to be moved to the most comfortable position of use for near or distance vision. This mechanism also serves to firmly hold the entire eyeglass frame against the nose of a wearer when the lenses 20 are moved to their elevated or reading position as shown by broken line in FIG. 1.

Figure 3:
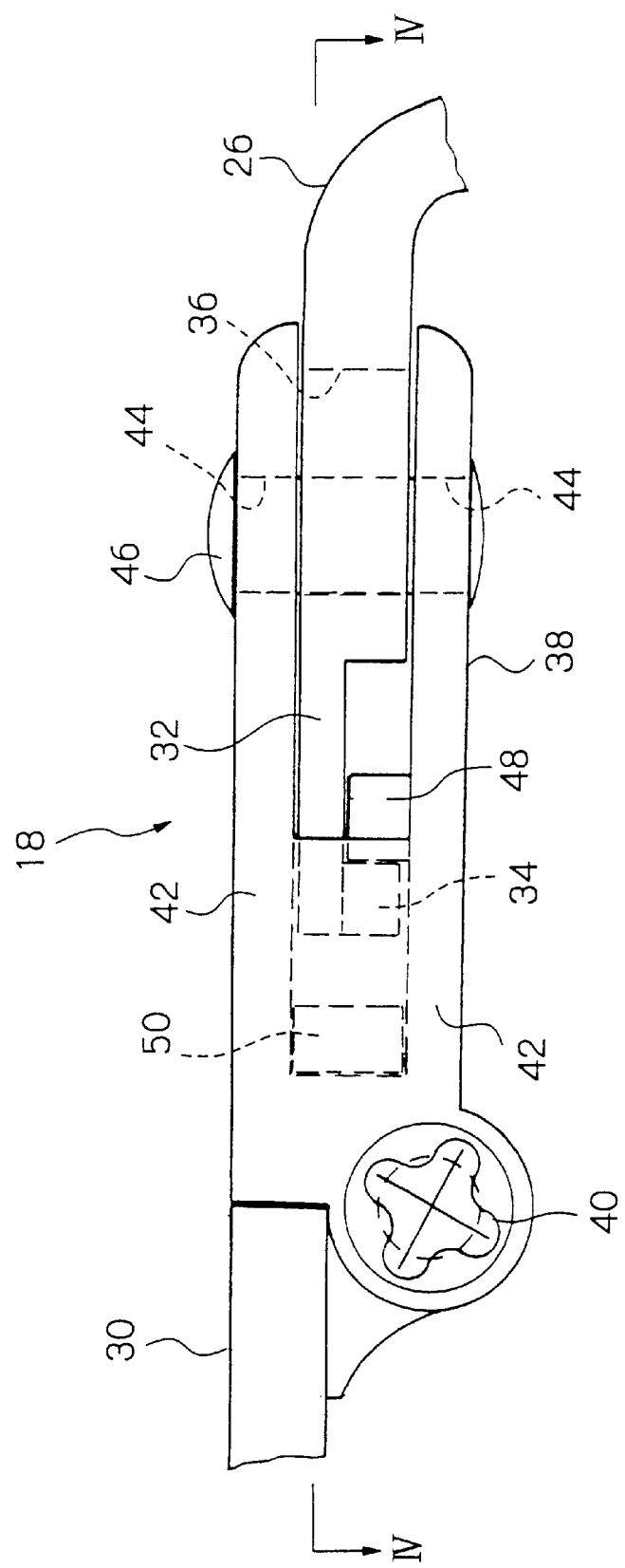
FIG. 3 is an enlarged view of the adjusting mechanism shown in FIG. 2.
Figure 4:
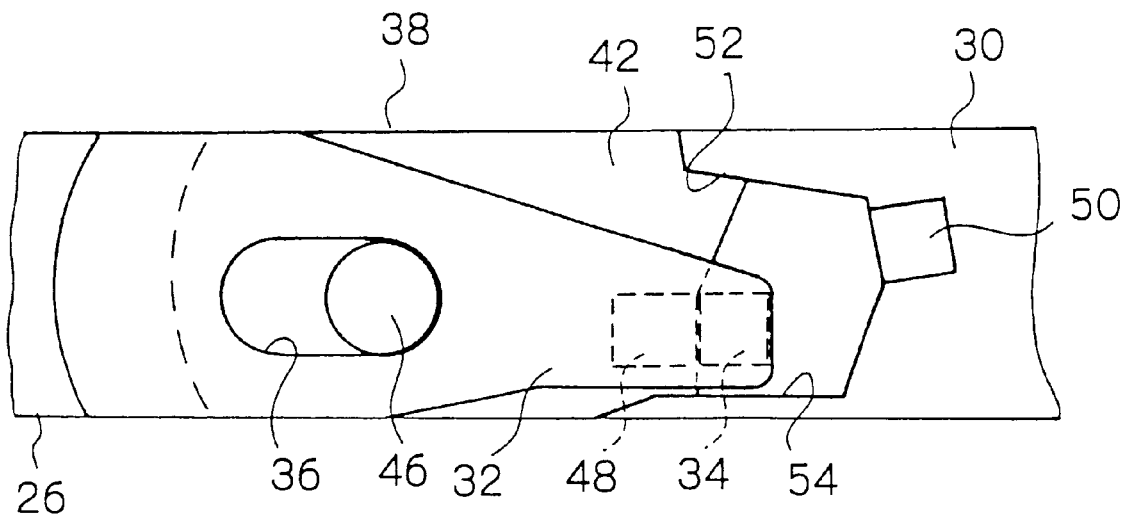
FIG. 4 is a sectional view of the adjusting mechanism taken on the line IV—IV in FIG. 3 with the lenses in their normal position.
Figure 5:
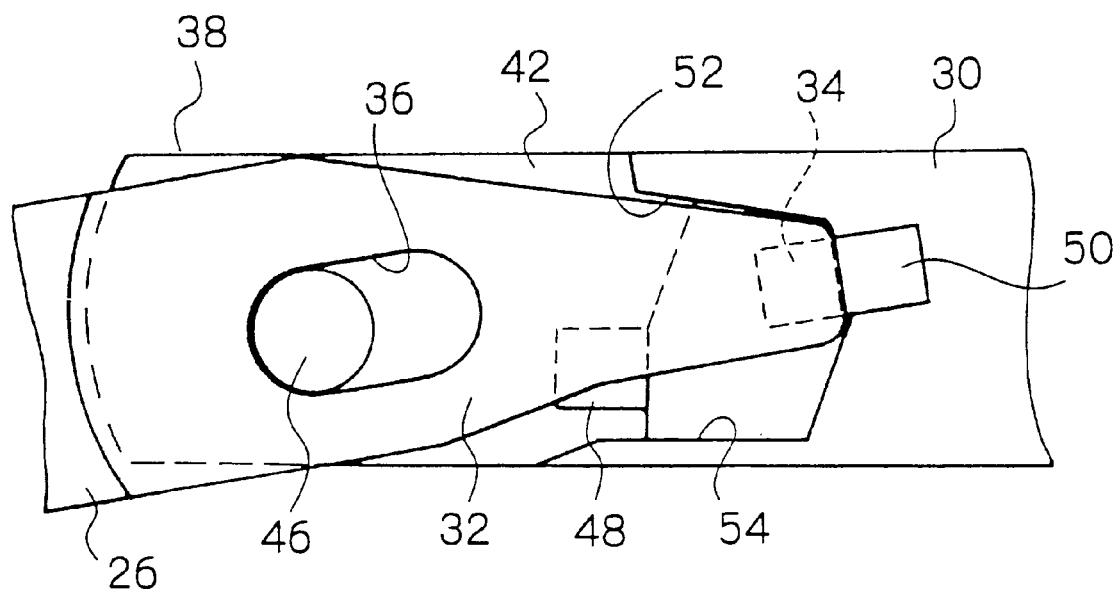
FIG. 5 is a view similar to that of FIG. 4, but with the lenses in their reading position.

Referring to FIGS. 3 to 5 wherein a first embodiment of the present invention is shown, each of the temples 18 is composed of a joint 26 fixedly attached to the upper end of the rim 14, a bend 28 for resting behind a user's ear (see FIG. 1), and a leg 30 extending between the joint 26 and the bend 28. The joint 26 has a generally triangular projection 32, the thickness of which is less than one half of that of the rest of the joint 26 as shown best in FIG. 3. A magnet 34 is fixedly attached to the free end of the triangular end or projection 32. The joint 26 also has an ellipsoidal slot 36. The leg 30 has a bifurcated end 38 which is pivotally connected to the rest of the leg 30 by a hinge 40 so that the temples 18 can be folded across the nasal side of the lenses 20. The bifurcated end 38 of the leg 30 has two parallel arms 42 between which the joint 26 is inserted. A circular hole 44 is formed in one end of each of the arms 42 opposite the hinge 40. A pivot pin 46 extends through the holes 44 and the slot 36 to provide a pivotal connection between the joint 26 and the leg 30 and thus, permit vertical angular adjustment between the lenses 20 and the temples 18. The slot 36 is elongated along the length of the joint 26 so that the joint 26 and the leg 30 are slidingly movable relative to each other. Two fixed magnets 48, 50 are mounted between the two arms 42. The magnet 50 is positioned behind and above the magnet 48.

When the lenses 20 are in a normal position as shown by solid line in FIG. 1, the joints 26 and the legs 30 are aligned along the axes of the temples 18, with the magnets 34 attached to the magnets 48, so that the distance segments of the lenses 20 are positioned directly before the eyes of a user. To move the lenses 20 from their normal to reading positions, the joints 26 are pivoted downwardly about the respective pivot pins 46. During this pivotal movement, the magnets 34 are separated from the magnets 48 and moved toward the magnets 50. The downward movement is stopped when the projections 32 are brought into contact with upper steps 52 of the legs 30. At this time, the magnets 34 are magnetically attached to the magnets 50. When the joints 26 are bent relative to the legs 30 as shown by broken line in FIG. 1, the lenses 20 are inclined forward so that the plane of the lenses 20 are at a proper angle with respective to a line of sight therethrough. When the lenses 20 are moved from their normal to elevated or reading position, the joints 26 are moved toward the legs 30. In other words, the distance between the point at which the joint 26 is connected to the rim 14 and the front end of the leg 30 is shorter when the lenses 20 are in their elevated position than when the lenses 20 are in their normal position. This arrangement ensures holding of the lens frame against the nose of the user and prevents undesirable displacement or drop of the eyeglass frame from the nose of the user. To return the lenses 20 to their normal position, the joints 26 are pivoted upwardly about the respective pivot pins 46. During this pivotal movement, the magnets 34 are separated from the magnets 50 and then, moved toward the magnets 48. The upward pivotal movement continues until the projections 32 are brought into contact with lower steps 54 of the legs 26, and the magnets 34 are magnetically attached to the magnets 48.

Figure 6:
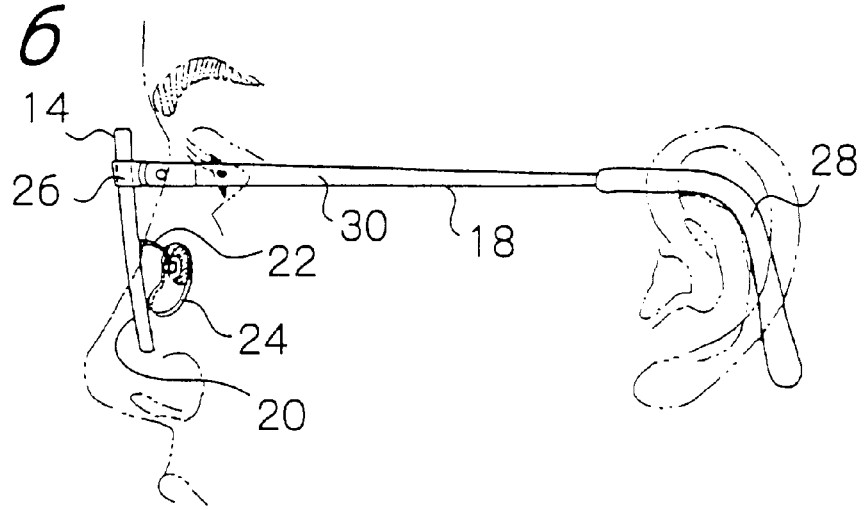
FIG. 6 is a side view of the eyeglass frame with the lenses in their normal position.
Figure 7:
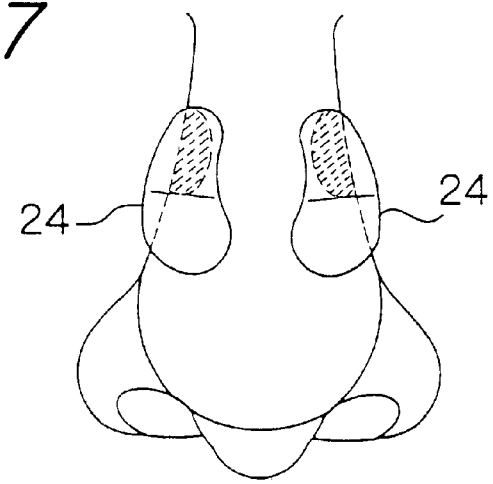
FIG. 7 is a front view, on an enlarged scale, of a set of nose pads shown in FIG. 6.
Figure 8:
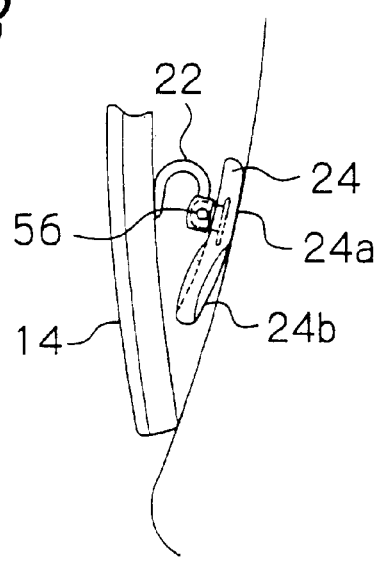
FIG. 8 is an enlarged side view of the nose pads shown in FIG. 6.
Figure 9:
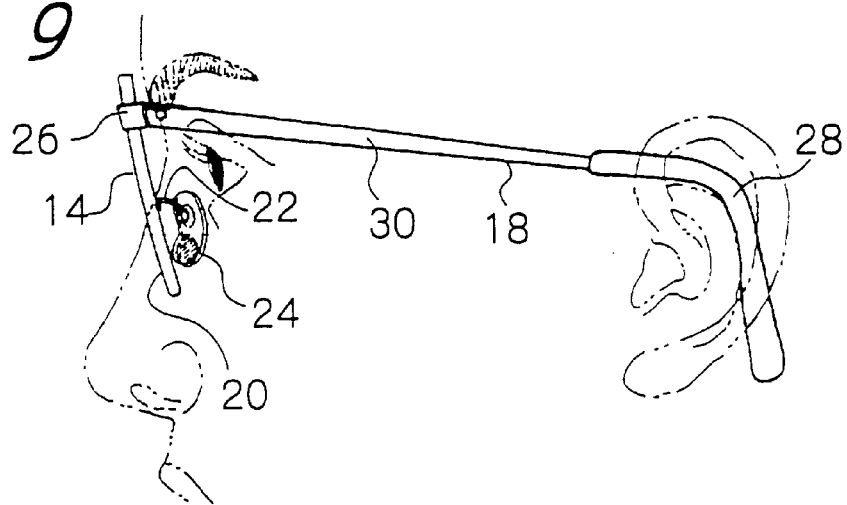
FIG. 9 is a view similar to that of FIG. 6, but showing the lenses in their elevated or reading position.
Figure 10:
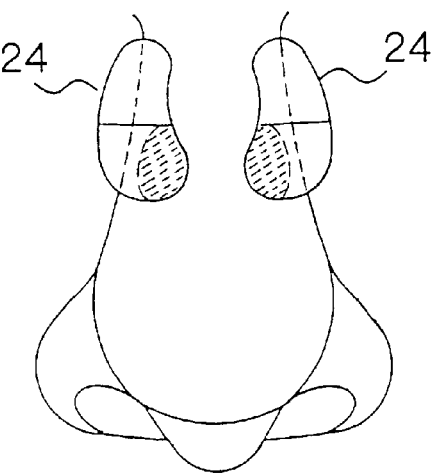
FIG. 10 is a front view, on an enlarged scale, of a set of nose pads shown in FIG. 9.
Figure 11:
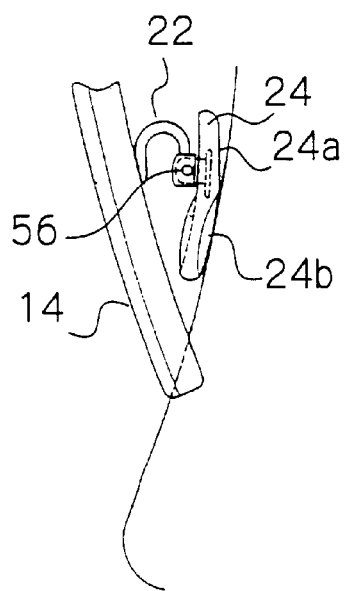
FIG. 11 is an enlarged side view of the nose pads shown in FIG. 9.

Referring next to FIGS. 6 to 11, each of the nose pads 24 is bent at a portion intermediate its length and has an upper contact surface 24a and a lower contact surface 24b. When the lenses 20 are in their normal position as shown in FIG. 6, the upper contact surface 24a of the nose pad 24 is in contact with the nose of the user. The nose pads 24 are upwardly moved along the nose when the lenses 20 are moved to their elevated or reading position as shown in FIG. 9. At this time, each of the nose pads 24 is pivoted as at 56 to bring the lower contact surface 24b of the nose pad 24 into contact with the nose of the user so as to accommodate inclination of the rims 14.

Figure 12:
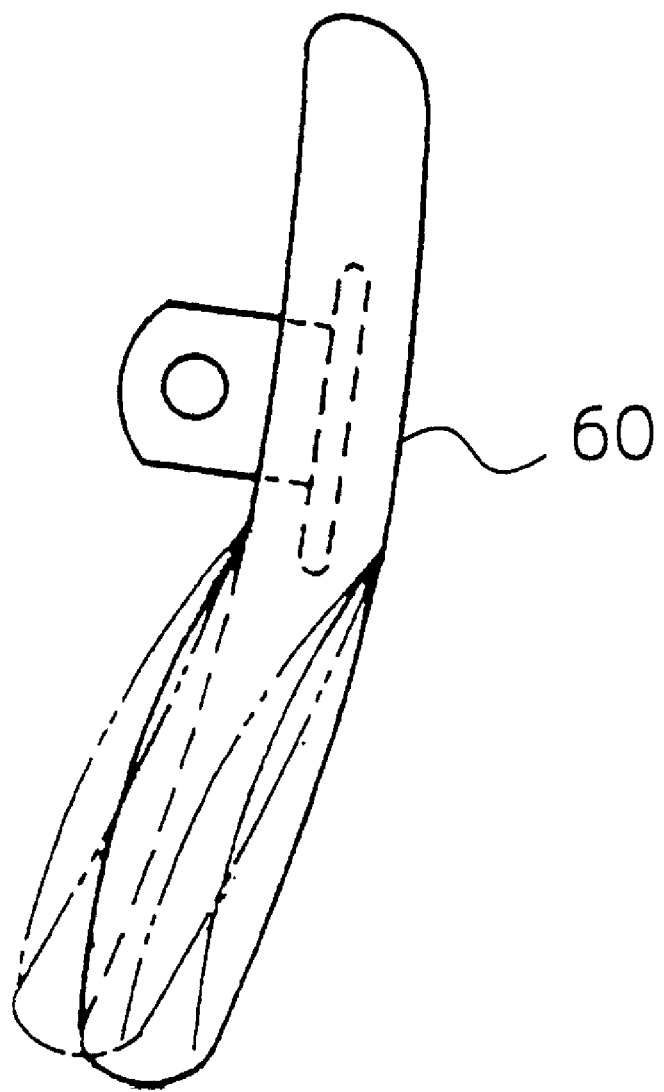
FIG. 12 is a side view of a modified form of the nose pad shown in FIGS. 6 to 11.
Figure 13:
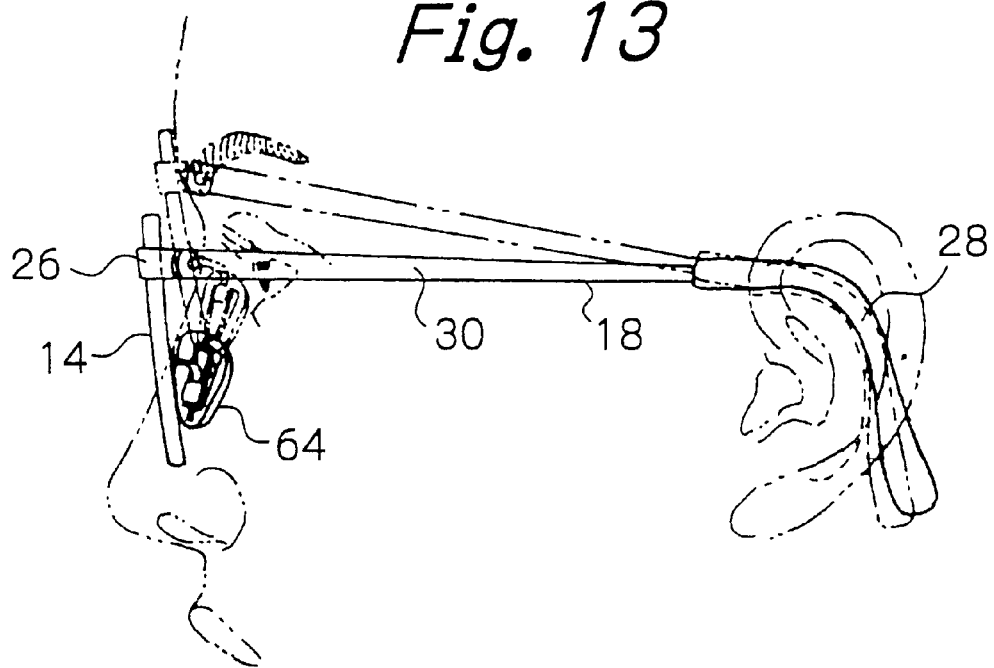
FIG. 13 is a view similar to that of FIG. 1, but showing a modified form of the nose pads.
Figure 14:
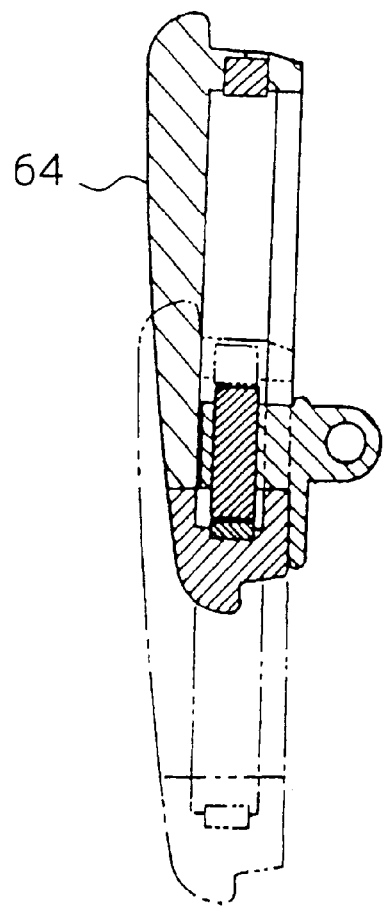
FIG. 14 is a sectional view of the nose pad shown in FIG. 13.

As shown in FIG. 12, a pair of nose pads 60 (only one is shown) may be made of a suitable flexible material so that they may be bent when the lenses 20 are moved between their normal and reading positions. There may also be utilized a pair of slidable nose pads 64 which are movable relative to their associated pad arms, as shown in FIGS. 13 and 14. Such slidable nose pads are described in detail in U.S. Pat. No. 5, 691,796 issued to Negishi, the contents of which are incorporated herein by reference.

FIGS. 15 to 18 show a second embodiment of the vertical plane adjusting mechanism according to the present invention. This embodiment is different from the first embodiment only in that two additional magnets are mounted in each of the legs. Like parts are given like reference numerals used in the previous embodiment and will not be described herein.

Figure 15:
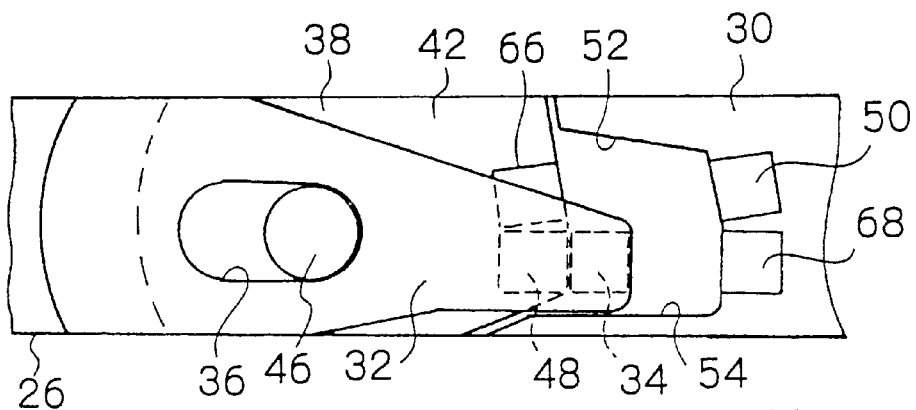
FIGS. 15 to 18 illustrate a second embodiment of the vertical plane adjusting mechanism according to the present invention.
Figure 16:
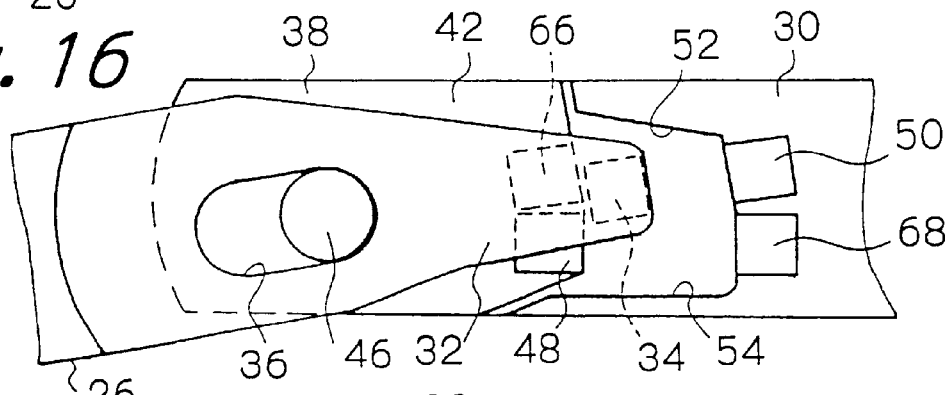
Figure 17:
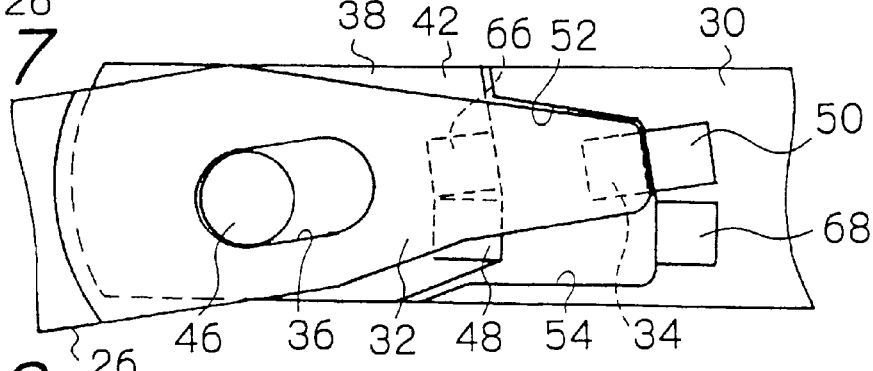
Figure 18:
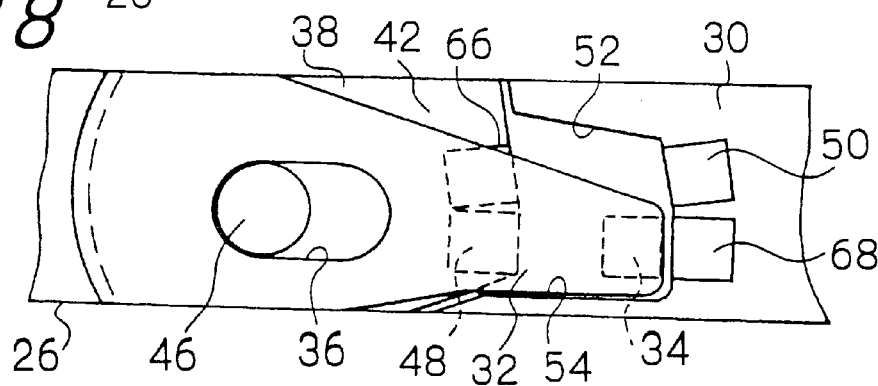

A fixed magnet 66 is mounted between the two arms 42 and located above the magnet 48. Also, a fixed magnet 68 is mounted below the magnet 50. The magnets 66, 68 are identical in polarity to the magnet 34. When the lenses 20 are in their normal position, the magnets 34 are attached to the magnets 48 as shown in FIG. 15. To change the lenses 20 from their normal position to reading position, the joints 26 are downwardly pivoted about the respective pivot pins 46. This pivotal movement causes the magnets 34 to be separated from the magnets 48. When the magnets 34 reaches the magnets 66 as shown in FIG. 16, a repulsive force is generated between the magnets 34 and the magnets 66. This force causes the joints 26 to be moved toward the legs 30. The magnets 34 are then attached to the magnets 50 as shown in FIG. 17 to hold the lenses 20 in their reading position. To return the lenses 20 to their normal position, the joints 26 are upwardly pivoted about the respective pivot pins 46. The magnets 34 are then separated from the magnets 50 and moved toward the magnets 68. When the magnets 34 reach the magnets 68 as shown in FIG. 18, a repulsive force is generated between the magnets 34 and the magnets 68. This force causes the joints 26 to be moved in a direction away from the legs 30. As a result, the magnets 34 are again magnetically attracted to the magnets 48 as shown in FIG. 15. In this embodiment too, the slots 36 and the pivot pins 46 coact to allow the joints 26 to be moved in a direction toward and away from the legs 30 when the lenses 20 are moved between their normal and reading positions.

Figure 19:
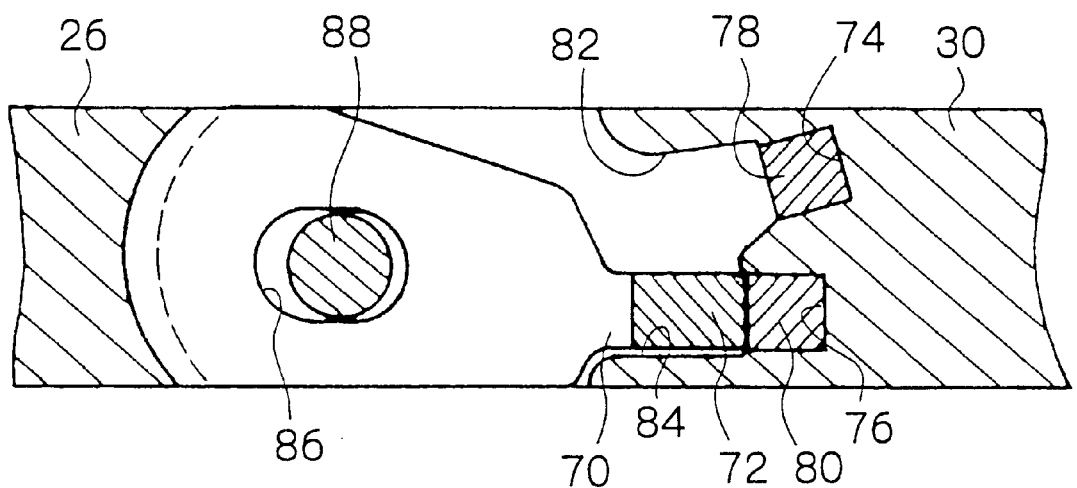
FIGS. 19 and 20 illustrate a third embodiment of the vertical plane adjusting mechanism according to the present invention.
Figure 20:
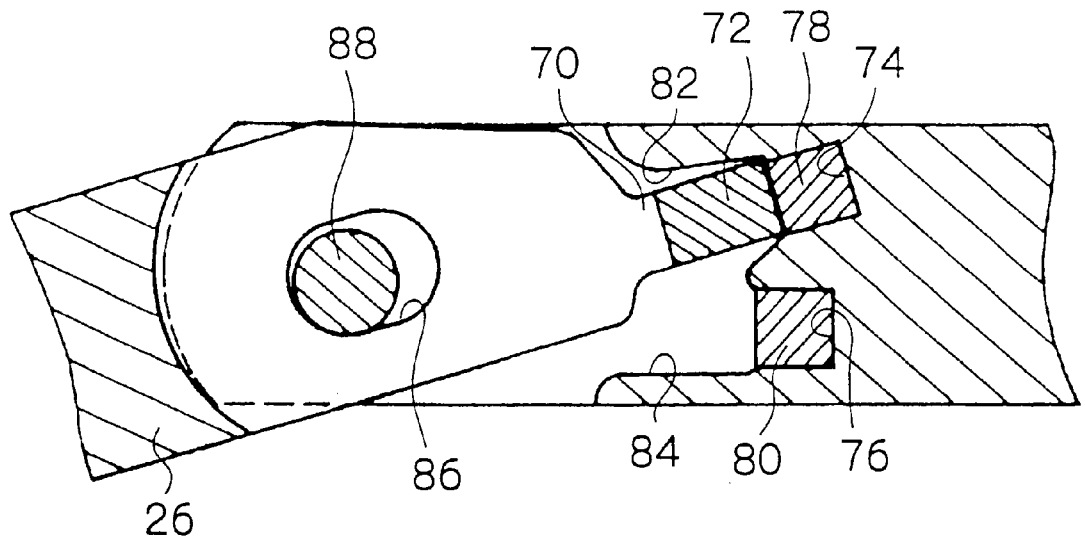

FIGS. 19 and 20 illustrate a third embodiment of the vertical plane adjusting mechanism according to the present invention. Specifically, each of the joints 26 has a rectangular projection 70 to which a magnet 72 is attached. The leg 30 has a deep recess 74 and a shallow recess 76 formed below the deep recess 74. Magnets 78, 80 are received in the recesses 74, 76, respectively. The magnet 72 and the magnets 78, 80 have opposite polarities and are thus magnetically attracted to one another. The leg 30 also includes an upper step or stopper 82 adjacent to the magnet 74, and a lower step or stopper 84 adjacent to the magnet 80. The joint 26 has an ellipsoidal slot 86. A pivot pin 88 extends through the slot 86 to provide a pivotal connection between the joint 26 and the leg 30 as in the previous embodiments.

When the lenses (see FIG. 1) are in their normal position as shown in FIG. 19, the rectangular projections 70 rest on the lower steps 84 of the legs 30 with the magnets 72 attached to the magnets 80. To change the lenses from their normal position to reading position, the joints 26 are downwardly pivoted about the respective pivot pins 88. This pivotal movement causes the magnets 72 to be disengaged from the magnets 80 and then moved toward the magnets 78. The pivotal movement continues until the rectangular projections 70 are brought into contact with the upper steps 82 of the leg 30. Since the magnets 78 are located slightly behind the magnets 80, the joints 26 are moved back toward the legs 30 when the magnets 72 are magnetically attached to the magnets 78 as shown in FIG. 20. This ensures tight holding of the eyeglass frame 12 in position, as in the previous embodiments. To return the lenses 20 to their normal position, the joints 26 are upwardly pivoted about the respective pivot pins 88. This pivotal movement causes the magnets 72 to be separated from the magnets 78 and then, moved toward the magnets 80. The magnets 72 are finally attached to the magnets 80 when the lenses are in their normal position.

Figure 21:
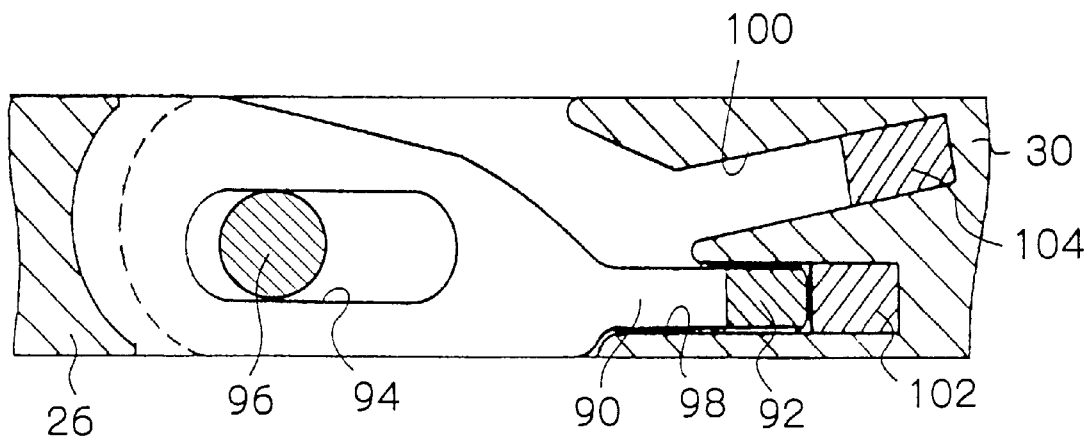
FIGS. 21 and 22 illustrate a fourth embodiment of the vertical plane adjusting mechanism according to the present invention.
Figure 22:
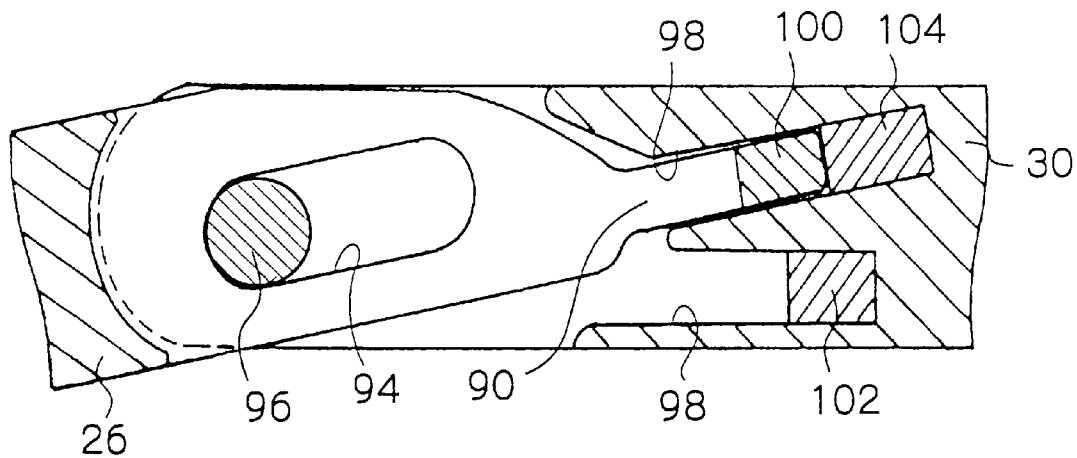

FIGS. 21 and 22 illustrate a fourth embodiment of the vertical plane adjusting mechanism made according to the present invention and incorporated into the eyeglass frame. This embodiment is similar to that shown in FIGS. 19 and 20, but enables more tight holding of the lenses against the nose of the user. Specifically, each of the joints 26 has an elongated projection 90. A magnet 92 is fixedly secured to the free, rear end of the projection 90. The joint 26 also includes an elongated slot 94 through which a pivot pin 96 extends so as to provide a pivotal connection between the joint 26 and the leg 30, as in the previous embodiments. The leg 30 includes a lower recess 98 and an upper recess 100 formed above and inclined relative to the lower recess 98. The both recesses 98, 100 have a sufficient depth. Two magnets 102, 104 are received in the bottom of the recesses 98, 100, respectively. The magnet 92 and the magnets 102, 104 have opposite polarities and are thus magnetically attracted to one another. The operation of this embodiment is similar to that of the embodiment shown in FIGS. 19 and 20 and will not be described herein.

Figure 23:
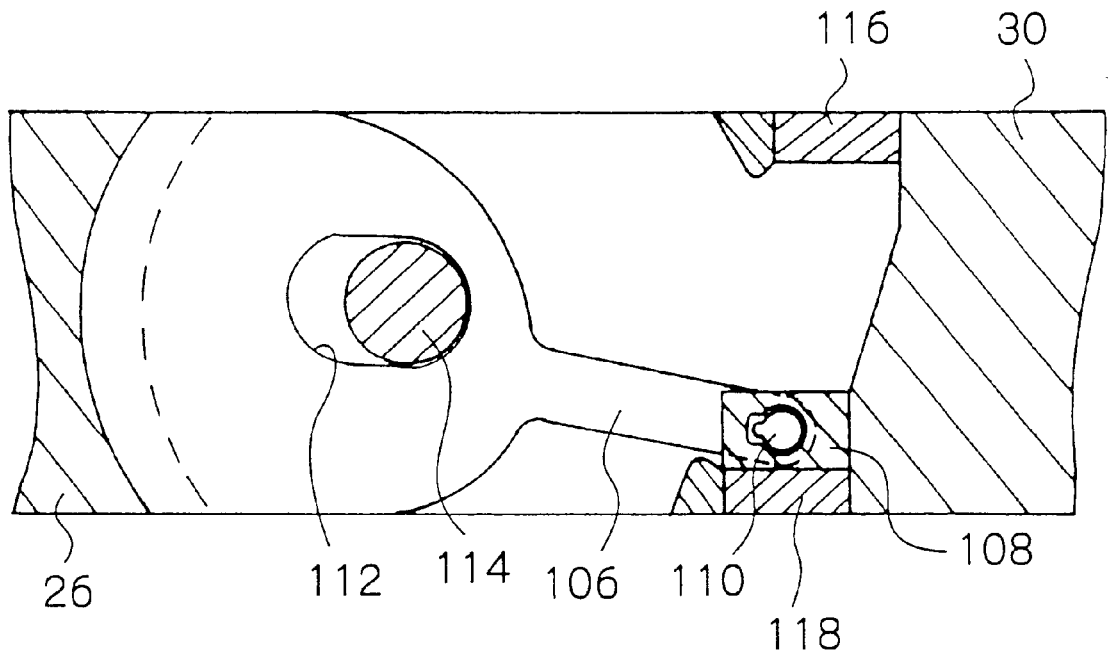
FIGS. 23 and 24 illustrate a fifth embodiment of the vertical plane adjusting mechanism according to the present invention.
Figure 24:
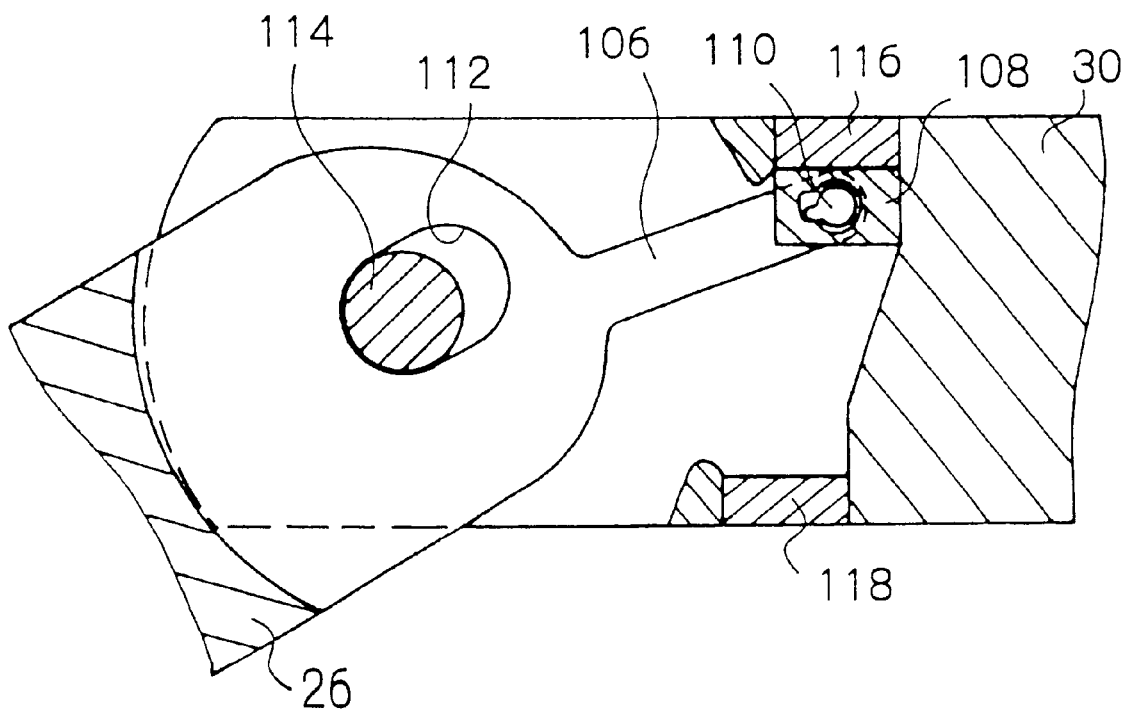

FIGS. 23 and 24 illustrate a fifth embodiment of the vertical plane adjusting mechanism made according to the present invention and incorporated into the eyeglass frame assembly. Each of the joints 26 has an elongated, rectangular projection 106. A magnet 108 is pivotally mounted as at 110 to the free end of the projection 106. The joint 26 also includes an ellipsoidal slot 112 through which a pivot pin 114 extends so as to provide a pivotal connection between the joint 26 and the leg 30, as in the previous embodiments. An upper magnet 116 is fixedly secured between the two arms of the leg 30. Similarly, a lower magnet 118 is fixedly secured between the two arms of the leg 30.

The operation of this embodiment is basically identical to that of the previous embodiments and will thus be described briefly. When the lenses are in their normal position as shown in FIG. 23, the magnets 108 are magnetically attached to the magnets 118. To move the lenses from their normal to reading position, the joints 26 are downwardly pivoted about the respective pivot pins 114. As a result, the magnets 108 are separated from the magnets 118 and moved toward the upper magnets 116. At this time, the joints 26 are moved toward the legs 30. The pivotal movement of the joints 26 is stopped when the magnets 108 are attached to the magnets 116 as shown in FIG. 24. It will be understood that reverse operation will return the lenses 20 to their normal position.

Figure 25:
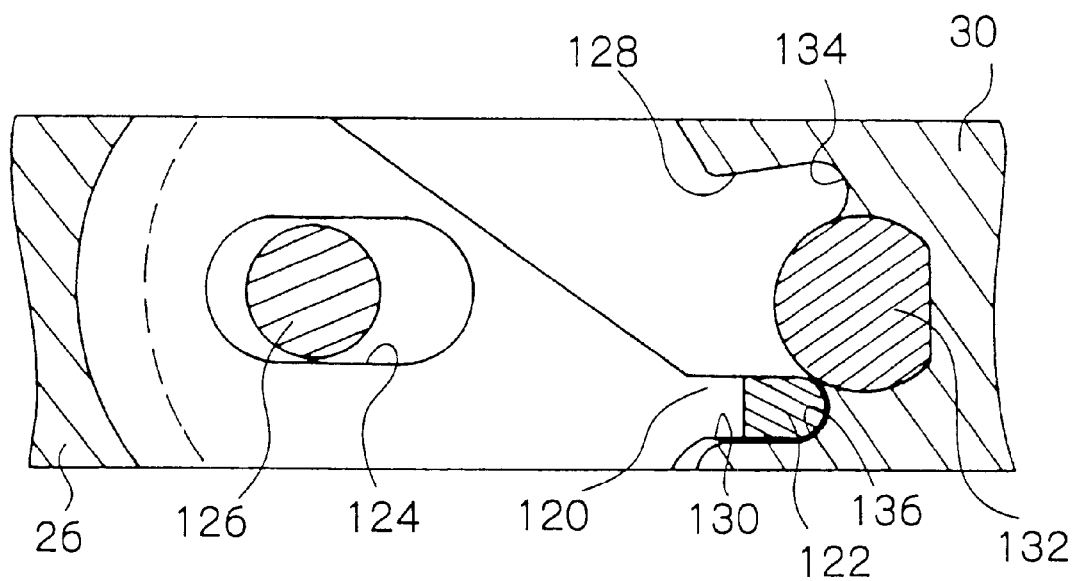
FIGS. 25 and 26 illustrate a sixth embodiment of the vertical plane adjusting mechanism according to the present invention.
Figure 26:
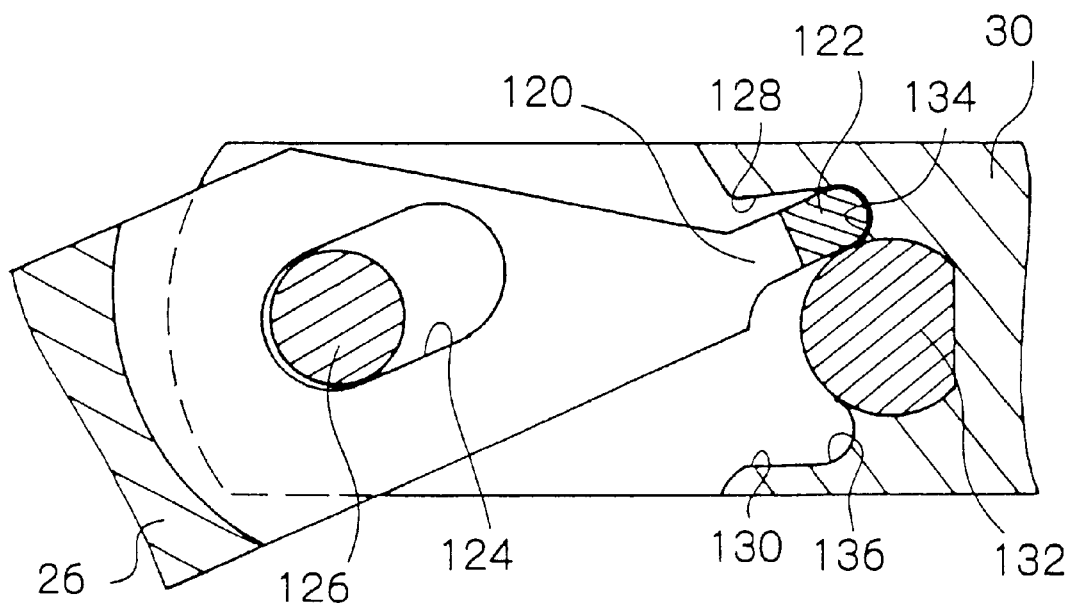

FIGS. 25 and 26 illustrate a sixth embodiment of the vertical plane adjusting mechanism made according to the present invention and incorporated into the eyeglass frame. Each of the joints 26 has at its free end a rectangular projection 120 with a rounded end. A magnet 122 is fixedly attached to the rounded end of the projection 120. The joint 26 also includes an ellipsoidal slot 124 through which a pivot pin 126 extends so as to provide a pivotal connection between the joint 26 and the leg 30, as in the previous embodiments. The leg 30 has an upper step 128 and a lower step 130 near at its upper end lower edges, respectively. A generally circular disc 132 is positioned between the upper step 128 and the lower step 130. The disc 132 coacts with the upper step 128 and the lower step 130 to form a relatively deep upper recess 134 and a relatively shallow lower recess 136, respectively. The upper recess 134 and the lower recess 136 have similar rounded ends. The disc 132 is made of a suitable magnetic material. The upper and lower ends of the disc 132 are opposite in polarity to the magnet 122.

When the lenses 20 (see FIG. 1) are in their normal position as shown in FIG. 25, the rectangular projections 120 rest on the lower steps 130 with the magnets 122 received in the lower recesses 136 and magnetically attached to the lower end of the discs 132. To change the lenses 20 from their normal to reading position, the joints 26 are downwardly pivoted about the respective pivot pins 126. As a result, the projections 120 with the corresponding magnets 122 are moved out of the lower recesses 130. The projections 120 are then moved over the middle portion of the discs 132 and then, into the upper recesses 134. At this time, the joints 26 are moved toward the legs 30, as in the previous embodiments. Finally, the rounded end of each of the projections 120 is fitted into the bottom of each of the upper recesses 134, and the magnet 122 is magnetically attached to the upper end of the disc 132 as shown in FIG. 26. It will be understood that reverse operation will return the lenses 20 to their normal position.

Figure 27:
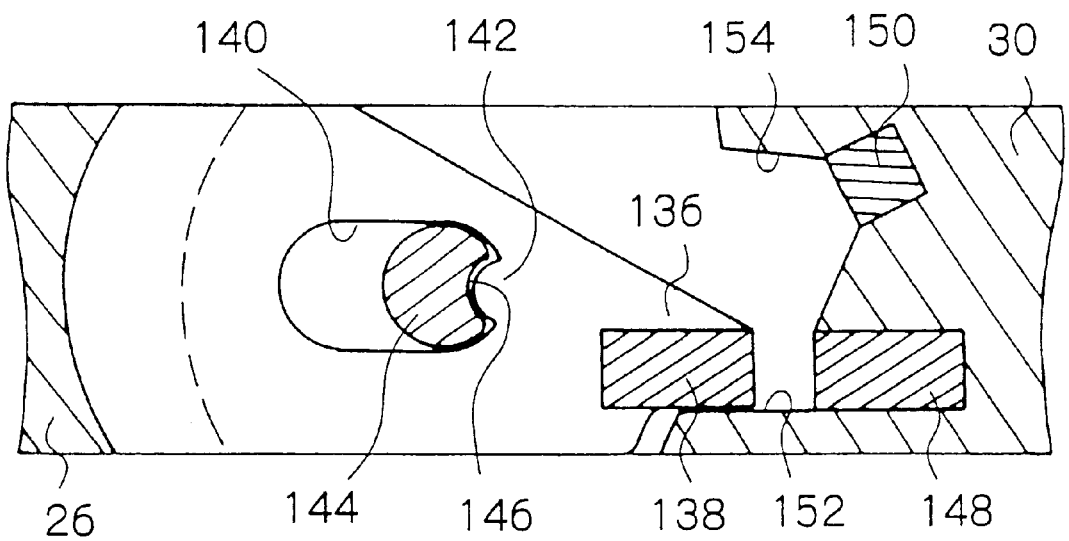
FIGS. 27 and 28 illustrate a seventh embodiment of the vertical plane adjusting mechanism according to the present invention.
Figure 28:
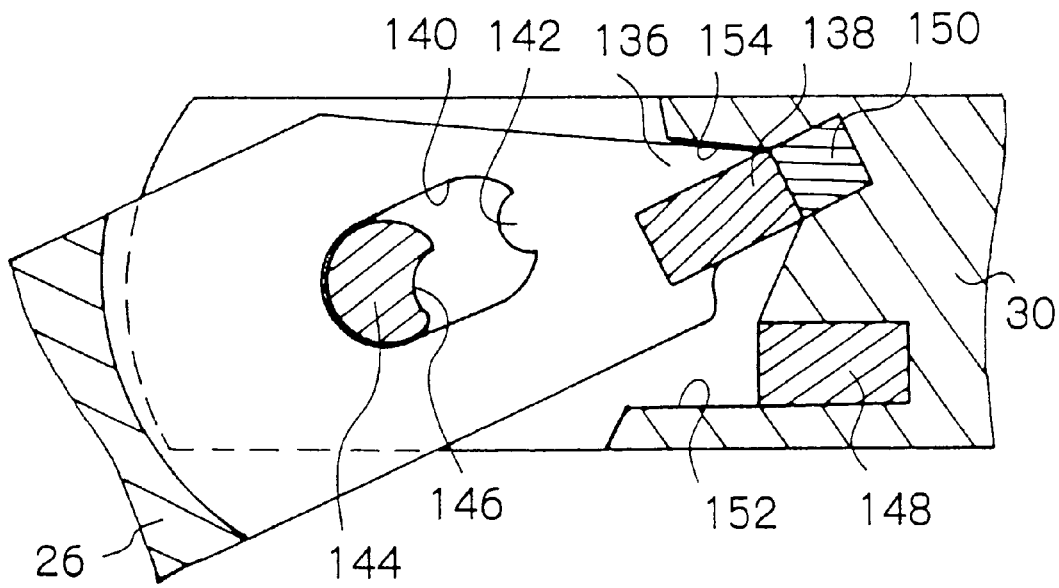

FIGS. 27 and 28 illustrate a seventh embodiment of the vertical plane adjusting mechanism made according to the present invention and incorporated into the eyeglass frame. Each of the joints 26 has at its free end a projection 136. A magnet 138 is fixedly secured to one side of the projection 136. The joint 26 also includes an elongated slot 140. A semicircular projection 142 extends into one end of the slot 140 adjacent to the projection 136. A pivot pin 144 extends through the slot 140 to provide a pivotal connection between the joint 26 and the leg 30. The pivot pin 144 has an axial groove 146 of a semicircular section. The leg 30 includes a lower magnet 148 and an upper magnet 150 located upwardly and slightly rearwardly from the lower magnet 148. The leg 30 also includes a lower step 152 and an upper step 154 formed adjacent to the lower magnet 148 and the upper magnet 150, respectively. The magnet 150 has a polarity opposite to that of the magnet 138, whereas the magnet 148 has the same polarity as the magnet 138.

When the lenses 20 (see FIG. 1) are in their normal position as shown in FIG. 27, the projections 136 of the joints 26 rest on the lower steps 152 of the legs 30. At this time, a repulsive force is generated between the magnets 138 and the magnets 148. This force urges the joints 26 against the pivot pins 144 with the projections 142 received in the grooves 146 so that the joints 26 and the legs 30 are aligned along the axes of the temples 18. To move the lenses 20 from their normal to reading position, the joints 26 are slightly moved forward to disengage the projections 142 from the grooves 146. The joints 26 are then pivoted about the respective pivot pins 144. This pivotal movement causes the magnets 138 to be moved toward the magnets 150. The joints 26 are moved rearwardly toward the legs 30 until the magnets 138 are magnetically attached to the magnets 150 as shown in FIG. 28. At this time, the pivot pins 144 are located at one end of the slots remote from the projections 136. It will be understood that reverse operation will return the lenses 20 to their normal position.

Figure 29:
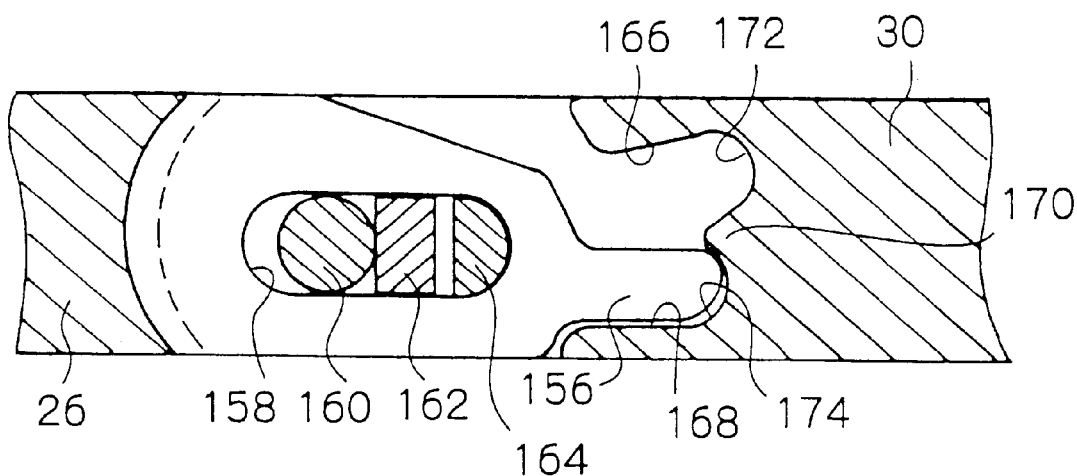
FIGS. 29 and 30 illustrate an eighth embodiment of the vertical plane adjusting mechanism according to the present invention.
Figure 30:
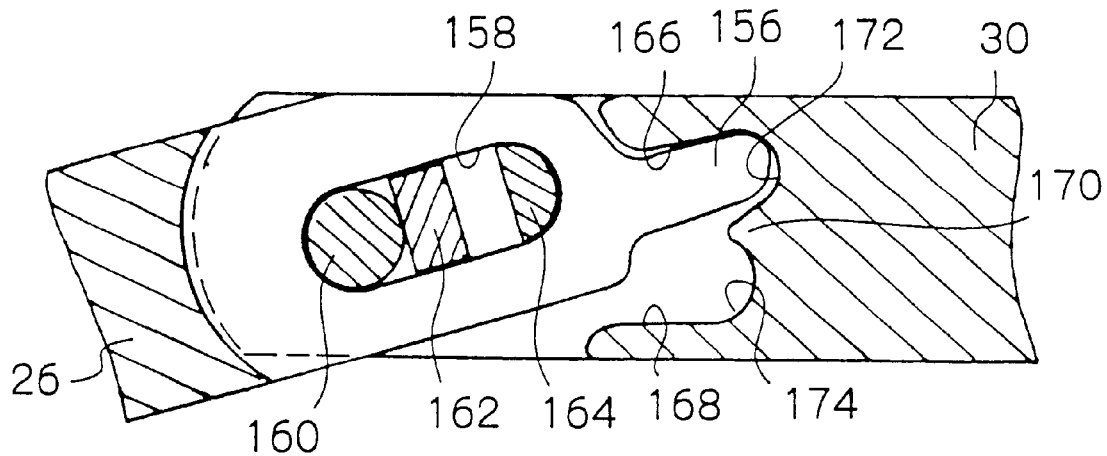

FIGS. 29 and 30 illustrate an eighth embodiment of the vertical plane adjusting mechanism made according to the present invention and incorporated into the eyeglass frame. Each of the joints 26 has at its free end an elongated projection 156 with a rounded end. The joint 26 also includes an ellipsoidal slot 158. As in the previous embodiments, a pivot pin 160 extends through the slot 158 so as to provide a pivotal connection between the joint 26 and the leg 30. A front magnet 162 is movably received in the slot 158 behind the pivot pin 160. A rear magnet 164 is fixedly mounted in the rear end of the slot 158. The front magnet 162 and the rear magnet 164 have the same polarity and are thus forced away from each other. The leg 30 includes an upper step 166 and a lower step 168 near at its upper and lower edges, respectively. A protrusion 170 is formed between the upper step 166 and the lower step 168. The protrusion 170 coacts with the upper and lower steps 166, 168 to form upper and lower recesses 172, 174, respectively. The upper recess 172 is slightly deeper than the lower recess 174.

When the lenses 20 (see FIG. 1) are in their normal position as shown in FIG. 29, the projections 156 rest on the lower steps 168. A repulsive force is generated between the magnets 162, 164 to thereby urge the magnets 162 against the pivot pins 160. The resulting reactive force holds the projections 156 in the lower recesses 174. To move the lenses from their normal to reading position, the joints 26 are slightly moved forward to disengage the projections 156 from the lower recesses 174. The repulsive force between the magnets 162, 164 urges the joints 26 toward the legs 30 after the projections 156 are moved over the protrusions 170. Finally, the projections 156 are moved into the upper recesses 172 as shown in FIG. 30. Again, the reactive force holds the projections 156 in the upper recesses 172. It will be understood that reverse operation will return the lenses 20 to their normal position.

Figure 31:
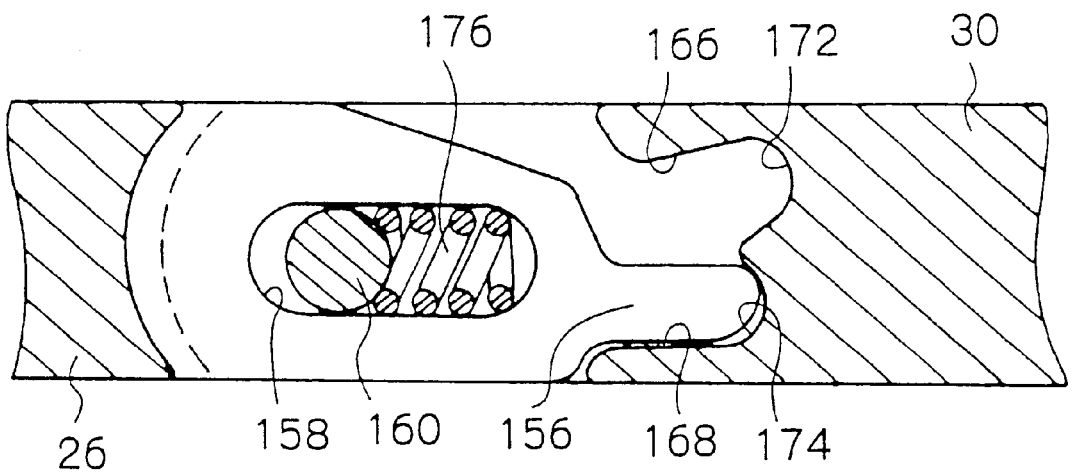
FIGS. 31 and 32 illustrate a ninth embodiment of the vertical plane adjusting mechanism according to the present invention.
Figure 32:
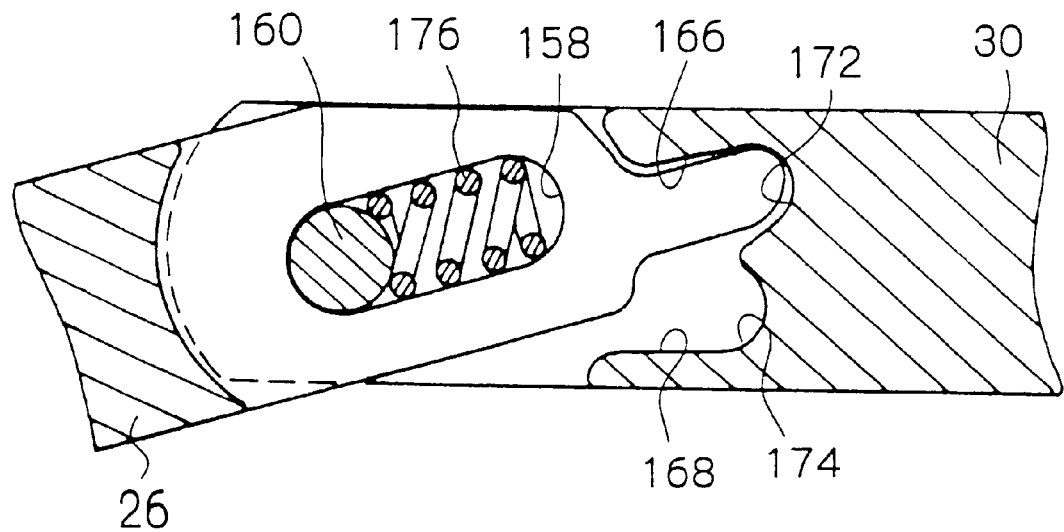
Figure 33:
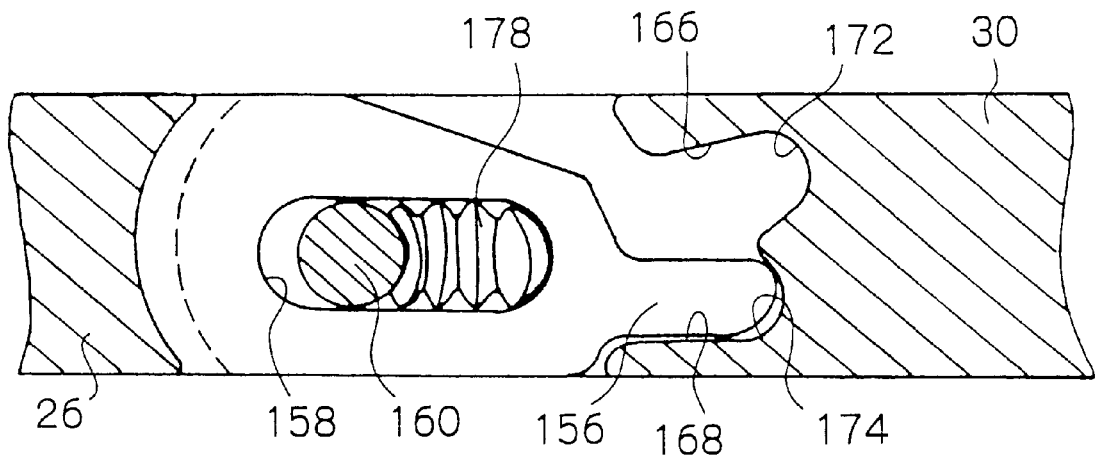
FIGS. 33 and 34 illustrate a tenth embodiment of the vertical plane adjusting mechanism according to the present invention.
Figure 34:
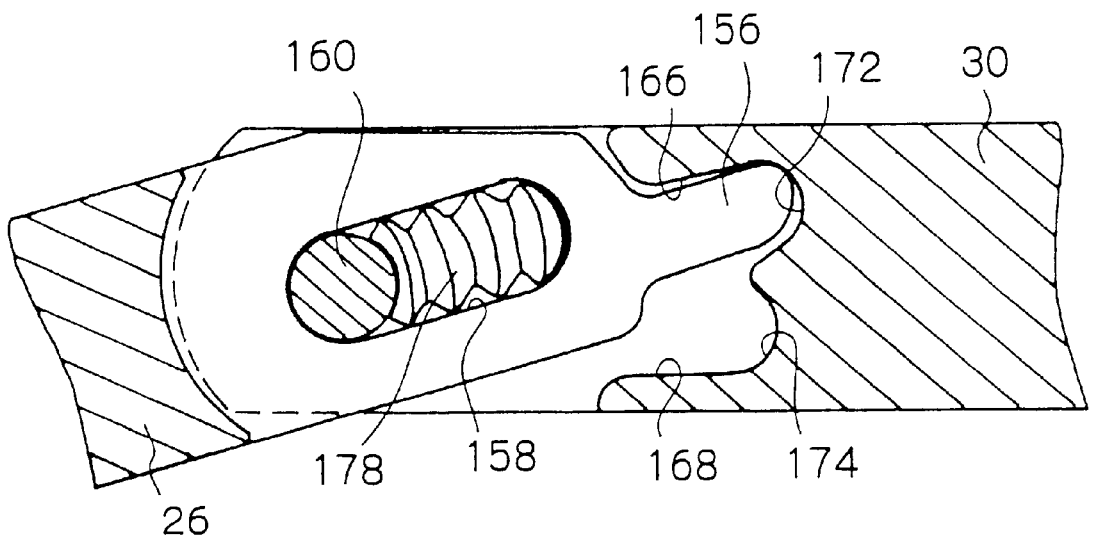

In lieu of the magnets 162, 164, a coil spring 176 may be inserted within the slot 158 as shown in FIGS. 31 and 32 wherein a ninth embodiment of the vertical plane adjusting mechanism made according to the present invention is illustrated. Alternatively, a resilient body in the form of an expandable bellows 178 may be inserted within the slot 158 as shown in FIGS. 33 and 34 wherein a tenth embodiment of the vertical plane adjusting mechanism made according to the present invention is illustrated. The expandable bellows 178 may be filled with gas or liquid. The coil spring 176 and the bellows 178 function in the same manner as the magnets 162, 164. Thus, the operation of the embodiments shown in FIGS. 31 to 34 will not be described herein.

Figure 35:
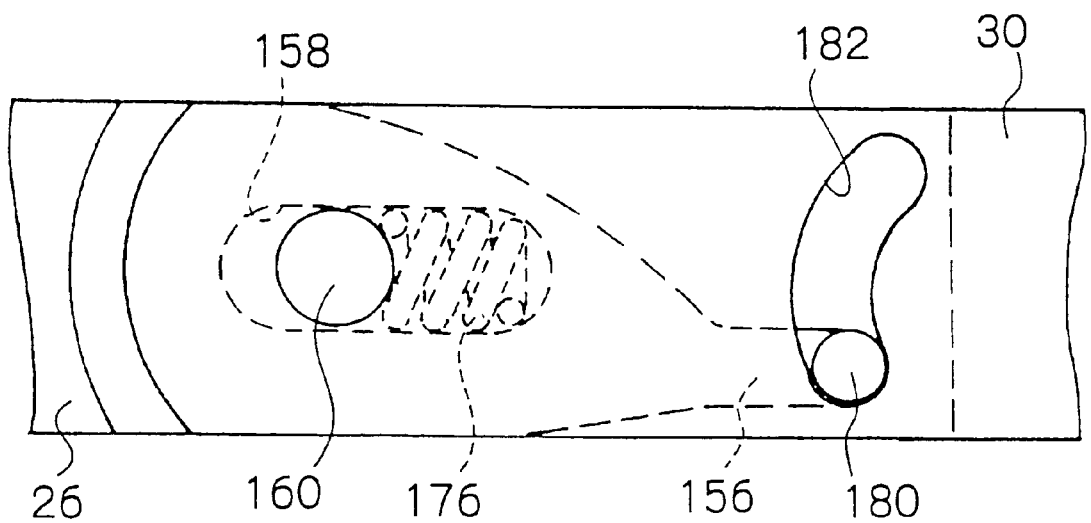
FIGS. 35 and 36 illustrate an eleventh embodiment of the vertical plane adjusting mechanism according to the present invention.
Figure 36:
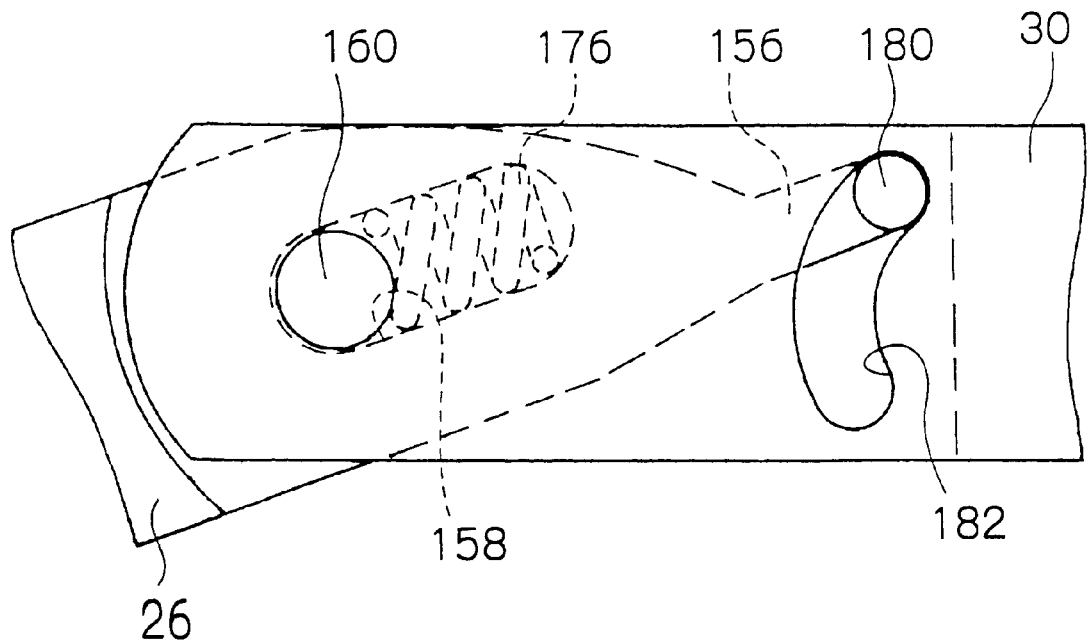

FIGS. 35 and 36 illustrate an eleventh embodiment of the vertical plane adjusting mechanism according to the present invention. This embodiment is similar to that shown in FIGS. 31 and 32. Like parts are thus given like reference numerals and will not be described in detail herein. A pin 180 extends laterally from one side of each of the projections 156. An arcuate slot 182 is formed in the leg 30 to guide the pin 180. The upper end of the arcuate slot 182 is located slightly behind the lower end of the slot 182.

When the lenses 20 (see FIG. 1) are in their normal position as shown in FIG. 35, the pins 180 are located in the lower end of the arcuate slots 180. The coil springs 176 constantly urges the joints 26 against the legs 30 through the pivot pins 160. To move the lenses 20 to their reading position, the joints 26 are pivoted downwardly about the respective pivot pins 160. This pivotal movement causes the pins 180 to be slidably moved toward the upper end of the arcuate slots 182. Since the upper end of the arcuate slots 182 is located behind the lower end of the arcuate slots 182, the joints 26 are displaced toward the legs 30 when the lenses 20 are moved to their reading position. The lenses 20 are held in their reading position when the pins 180 are moved to the upper end of the slots 182 as shown in FIG. 36.

Figure 37:
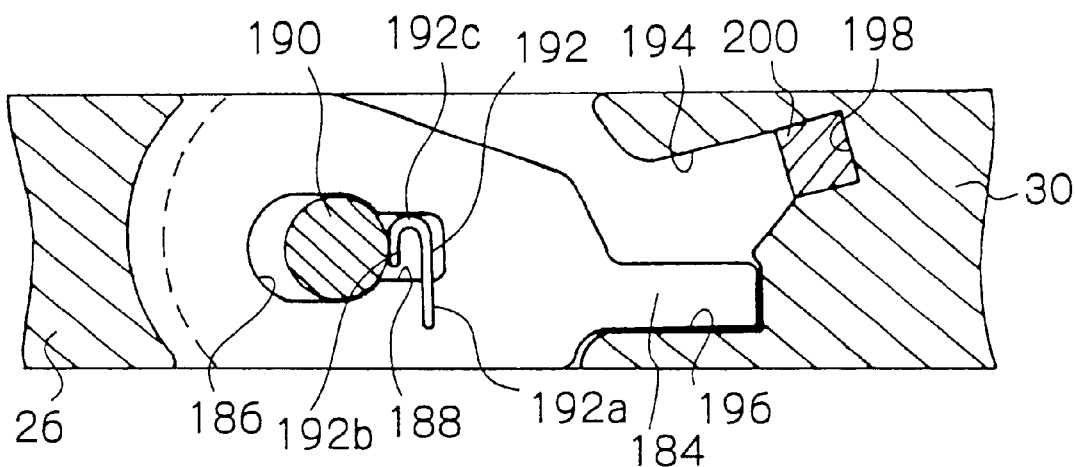
FIGS. 37 and 38 illustrate a twelfth embodiment of the vertical plane adjusting mechanism according to the present invention.
Figure 38:
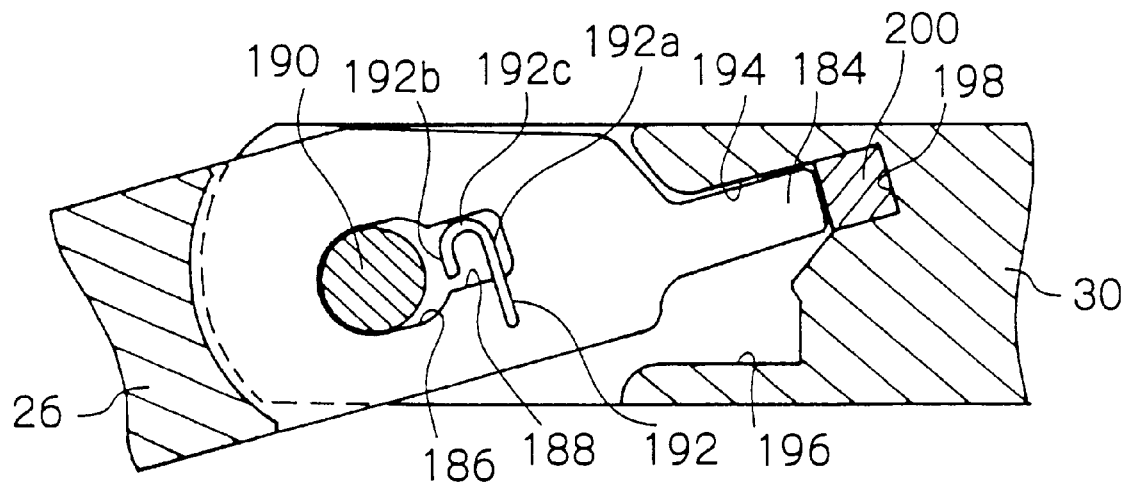

FIGS. 37 and 38 illustrate a twelfth embodiment of the vertical plane adjusting mechanism made according to the present invention and incorporated into the eyeglass frame. Each of the joints 26 has at its free end a rectangular plate or projection 184. Illustratively, the projection 184 is made of a suitable magnetic material. Alternatively, a magnet (not shown) may be secured to the free end of the projection 184. The joint 26 includes a generally ellipsoidal slot 186 and a generally rectangular slot 188 communicated with the ellipsoidal slot 186. A pivot pin 190 extends through the slot 186 so as to provide a pivotal connection between the joint 26 and the leg 30. A spring 192 has a long leg 192a and a short leg 192b connected to the long leg 192a through an arcuate portion 192c. The spring 192 thus has an inverted J-shape. The free end of the long leg 192a is inserted into the joint 26 so that the spring 192 is held within the rectangular slot 188. Normally, the short leg 192b is held in contact with the pivot pin 190. The leg 30 has an upper step 194 and a lower step 196 near at its upper and lower edges, respectively. A recess 198 is defined in the leg 30 adjacent to the upper step 194. A magnet 200 is received in bottom of the recess 198. The magnet 200 has a polarity opposite to that of the projection 184.

When the lenses 20 (see FIG. 1) are in their normal position as shown in FIG. 37, the projections 184 rest on the lower steps 196 of the legs 30. At this time, the spring 192 urges the pivot pins 190. The resulting reactive force is applied to the joints 26 so that the projections 184 can be firmly held in position on the lower steps 196. To move the lenses 20 to their reading position, the joints 26 are downwardly pivoted about the respective pivot pins 190. This pivotal movement causes the projections 184 to be disengaged from the lower steps 196. The pivotal movement continues until the projections 184 are brought into contact with the upper steps 194 of the legs 30 as shown in FIG. 38. At this time, the projections 184 are magnetically attached to the magnets 200. The short leg 192b of the spring 192 is held out of contact with the pivot pin 190 since the joint 26 is displaced toward the leg 30 during the pivotal movement. It will be understood that reverse operation will return the lenses 20 to their normal position.

Figure 39:
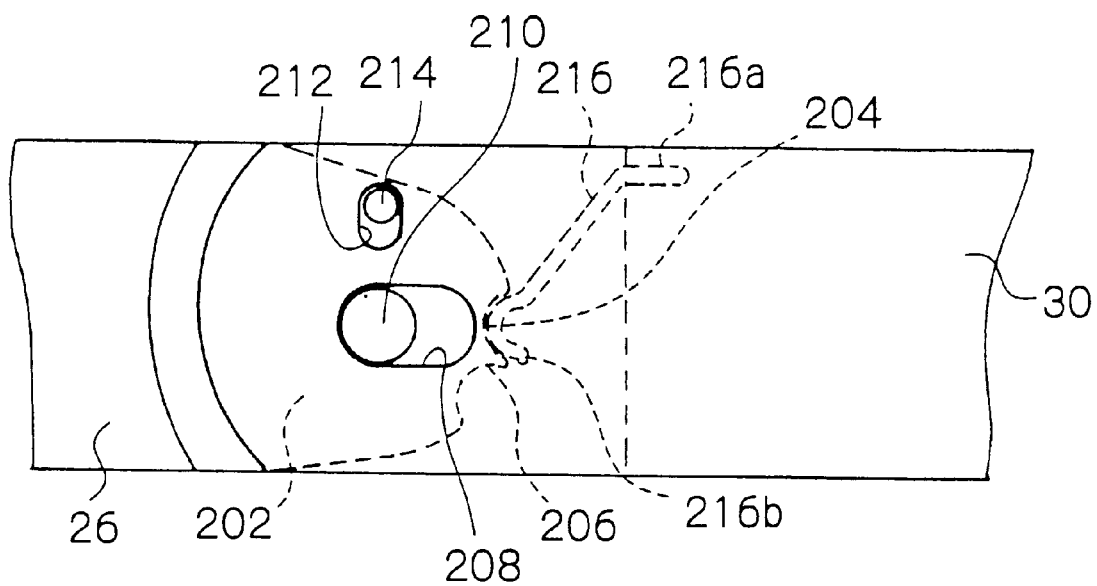
FIGS. 39 and 40 illustrate a thirteenth embodiment of the vertical plane adjusting mechanism according to the present invention.
Figure 40:
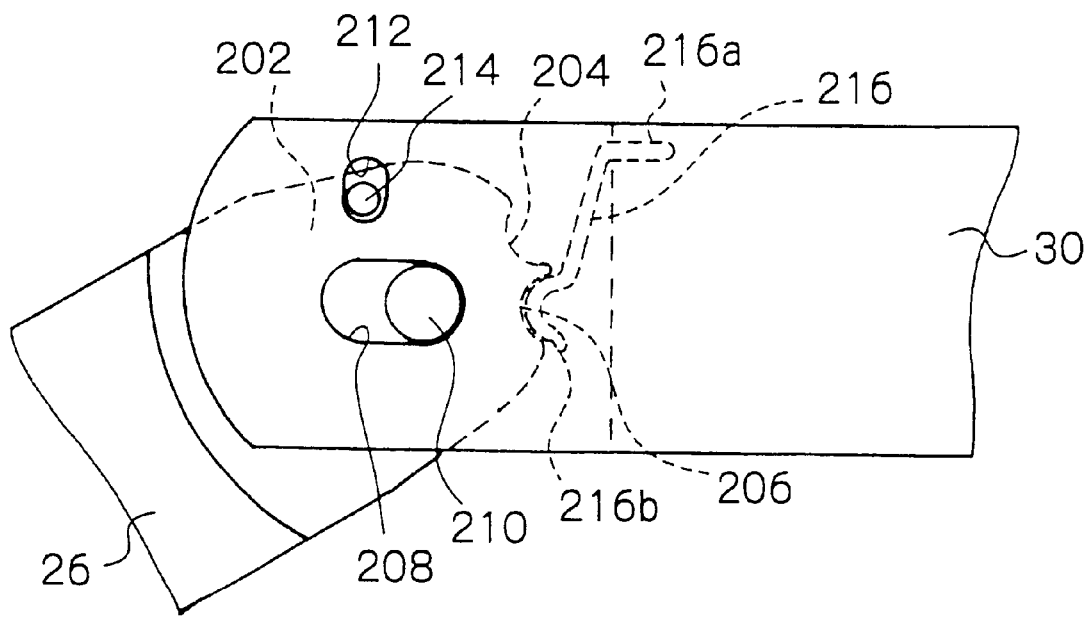

FIGS. 39 and 40 illustrate a thirteenth embodiment of the vertical plane adjusting mechanism made according to the present invention and incorporated into the eyeglass frame. Each of the joints 26 has at its free end a rounded projection 202. An upper arcuate recess 204 and a lower arcuate recess 206 are contiguously formed in the tip of the projection 202. The projection 202 also has an ellipsoidal horizontal slot 208 through which a pivot pin 210 extends so as to provide a pivotal connection between the joint 26 and the leg 30. A vertically elongated slot 212 is defined in each arm of the leg 30. A pin 214 is inserted though the rounded projection 201 at a location above the ellipsoidal slot 208 and secured thereto. The pin 214 also extends through the slots 212 of the leg 30. A spring 216 has a bent end 216a and an arcuate end 216b opposite the bent end 216a. The bent end 216a of the spring 216 is inserted into the leg 30, whereas the arcuate end 216b is selectively engaged with the upper and lower recesses 204, 206.

When the lenses 20 (see FIG. 1) are in their normal position as shown in FIG. 39, the arcuate ends 216b of the springs 216 are engaged within the upper recesses 204. The pivot pins 210 are located in the front end of the slots 208. The pins 214 serve to limit the upward movement of the joints 26 and ensure that the joints 26 and the legs 30 extend on a straight line. To move the lenses 20 from their normal to reading position, the joints 26 are downwardly pivoted about the respective pivot pins 210, as in the previous embodiments. This pivotal movement causes the arcuate ends 126b of the springs 126 to be disengaged from the upper recesses 204 and instead, brought into engagement with the lower recesses 206. The pivot pins 210 are now located in the rear end of the slots 208 as shown in FIG. 40. During this movement, the joints 26 are moved toward the legs 30 so as to firmly hold the eyeglass frame against the nose of the user. It will be understood that reverse operation will return the lenses 20 to their normal position.

Figure 41:
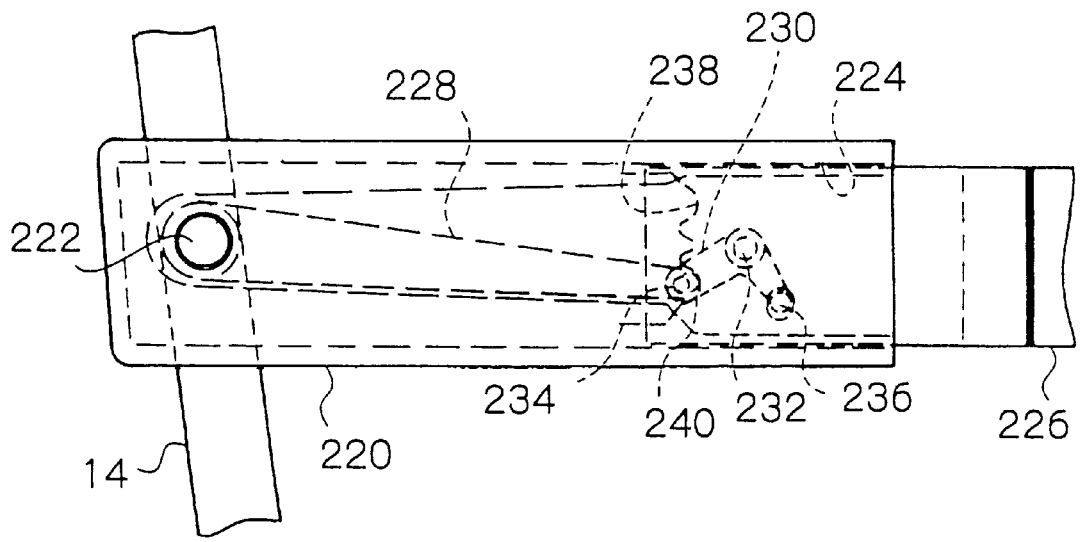
FIGS. 41 and 42 illustrate a fourteenth embodiment of the vertical plane adjusting mechanism according to the present invention.
Figure 42:
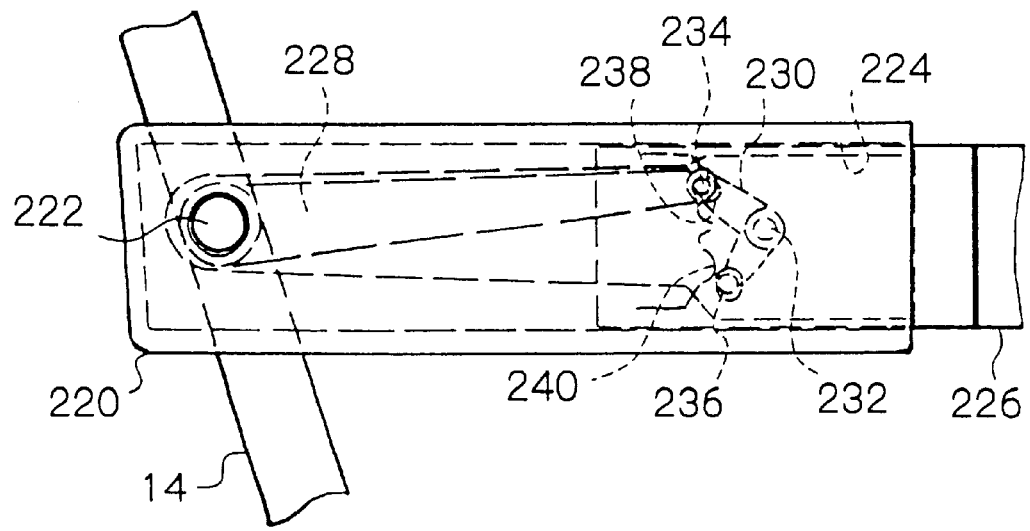

FIGS. 41 and 42 illustrate a fourteenth embodiment of the vertical plane adjusting mechanism made according to the present invention and incorporated into the eyeglass frame. In this embodiment, each temple includes a hollow joint 220 of a rectangular shape. A pin 222 is fixed to one side of the rim 14 and extends through the front end of the joint 220 so as to provide a pivotal connection between the lens frame and the joint 220. The rear end of the joint is open as at 224 to receive the front end of a leg 226. Within the joint 220, an elongated link 228 is pivotally connected at its front end to the pin 222. Also, a generally L-shaped link 230 is pivotally connected as at 232 to the rear end of the joint 220. The link 230 has a front end 234 pivotally connected to the rear end of the link 228 and a rear end 236 pivotally connected to the front end of the leg 226. An upper arcuate spring 238 and a lower arcuate spring 240 are secured within the hollow joint 220 adjacent to the rear end of the link 228.

When the lenses 20 (see FIG. 1) are in their normal position as shown in FIG. 41, the rims 14 extend in a direction substantially perpendicular to the joints 220, and the rear end of the links 228 is engaged with the lower springs 240. To move the lenses 20 from their normal to reading position, the rims 14 are downwardly pivoted about the respective pins 222, as in the previous embodiments. This pivotal movement causes corresponding pivotal movement of the links 228. As a result, the rear end of the links 228 is brought into engagement with the upper spring 238. During this movement, the joints 220 are moved toward the legs 226 whereby the front end of the leg 226 is moved more deeply into the interior of the joint 220. It will be understood that reverse operation will return the lenses 20 to their normal position.

Figure 43:
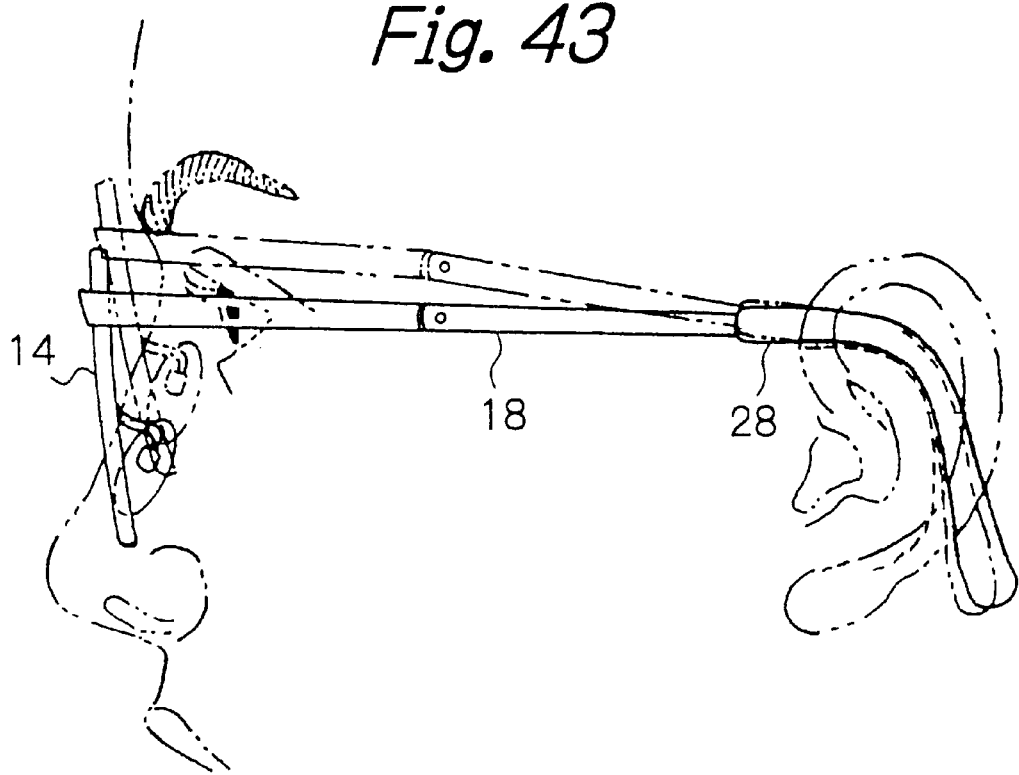
FIGS. 43 and 44 illustrate modified forms of the temple shown in FIG. 1.
Figure 44:
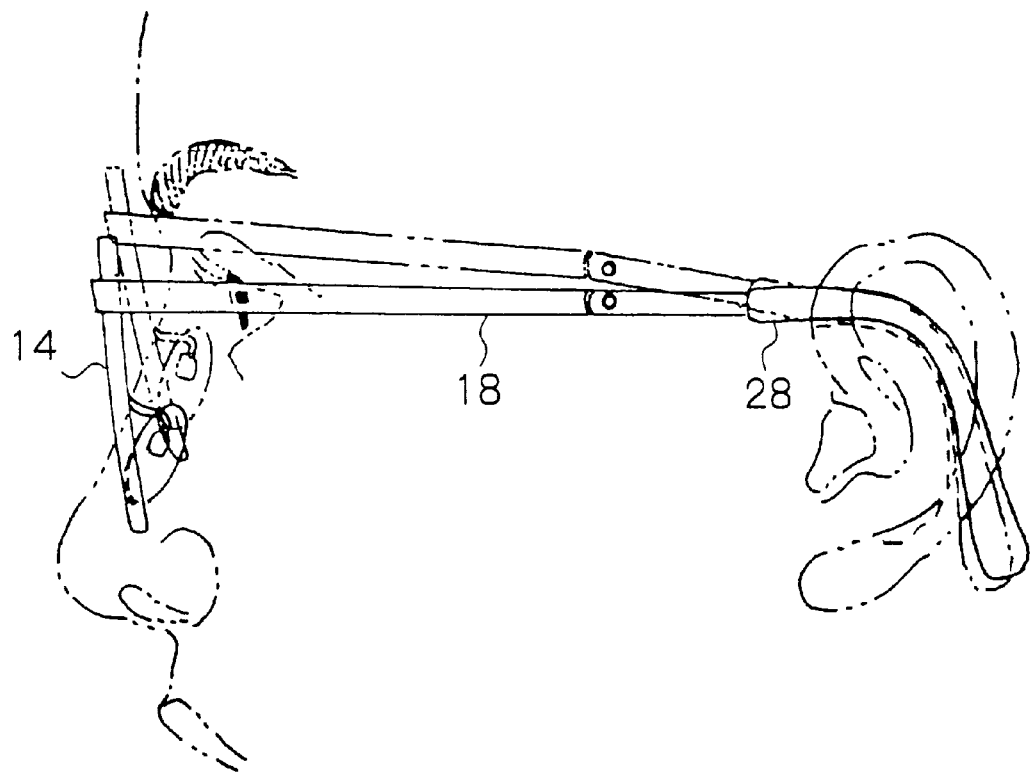

In any of the foregoing embodiments, the vertical plane adjusting mechanism is located near the rim 14. However, the mechanism may alternatively be located intermediate the length of the temple 18, as shown in FIG. 43. Still alternatively, the mechanism may be located near the bend 28 of the temple 18, as shown in FIG. 44.

Figure 45:
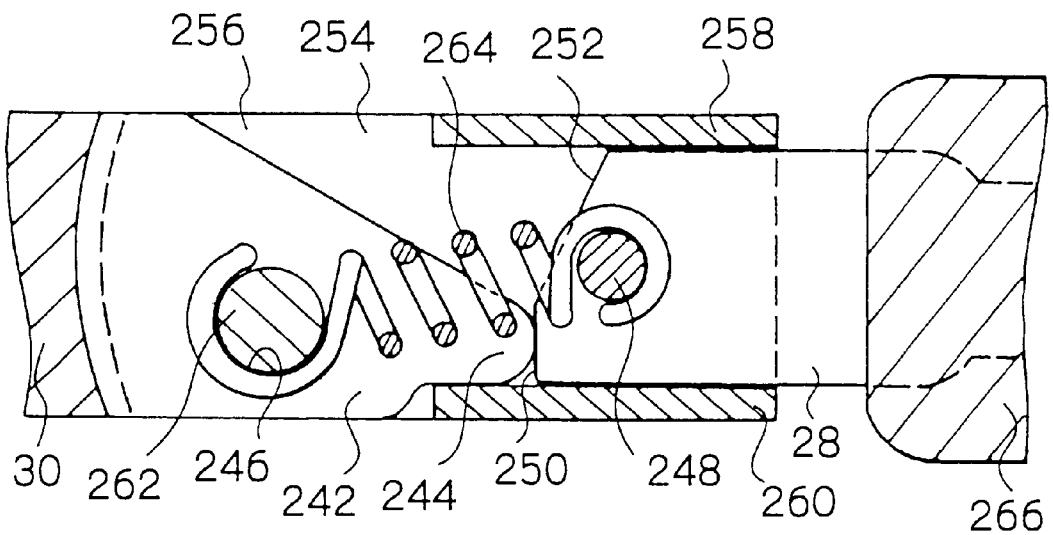
FIGS. 45 and 46 illustrate a fifteenth embodiment of the vertical plane adjusting mechanism according to the present invention.
Figure 46:
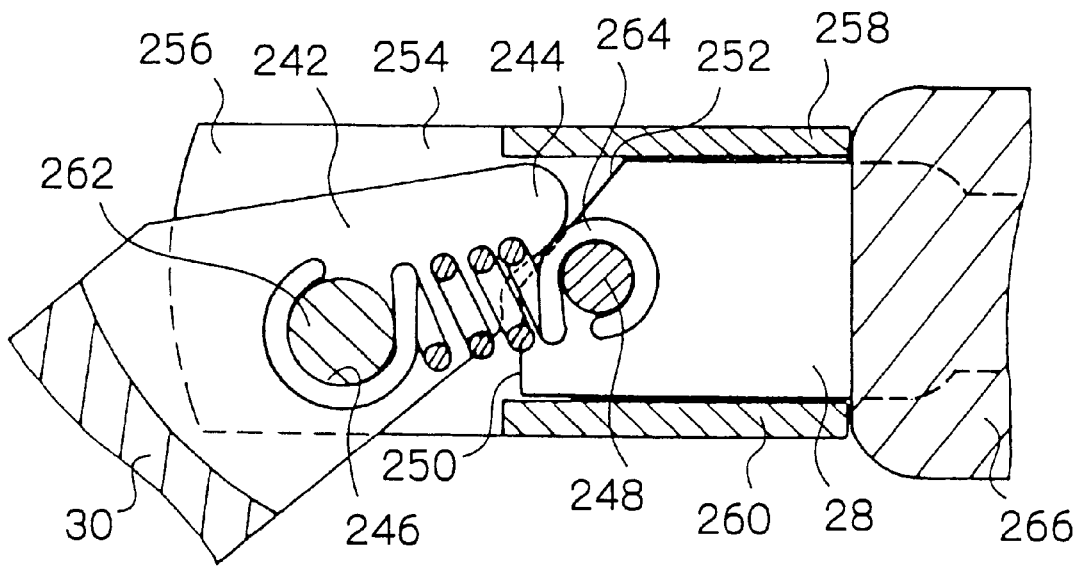

Referring now to FIGS. 45 and 46, there is illustrated a fifteenth embodiment of the vertical plane adjusting mechanism according to the present invention and arranged between the legs 30 and the bends 28 of the temples 18. Each of the legs 30 has a generally triangular projection 242 with a rounded end 244. A circular clearance hole 246 is formed in the projection 242. Each of the bends 28 has a pin 248 at its front end. The front end of the bend 28 includes a vertical lower edge 250 and an inclined upper edge 252 extending upwardly and rearwardly from the upper end of the vertical lower edge 250. A connecting member 254 is provided between the leg 30 and the bend 28 and has a generally rectangular plate 256. A pair of elongated upper and lower spacers 258, 260 are secured to the upper and lower edges of the plate 256, respectively. The spacers 258, 260 extend from the rear end of the plate 256 and terminate at a location intermediate the length of the plate 256. A space is defined between the upper and lower spacers 258, 260 to slidably receive the front end of the bend 28. A pin 262 extends from one side of the plate 256 and through the hole 246 of the leg 30 to allow pivotal movement of the leg 30. A coil spring 264 has one end engaged around the pin 248 and the other end engaged around the pin 262. An earpiece 266 is fitted over the bend 28. A cover plate (not shown) may be secured to one side of the upper and lower spacers 258, 260.

When the lenses (see FIG. 1) are in their normal position as shown in FIGS. 45, the rounded end 244 of the projection 242 is held in contact with the vertical lower edge 250 of the bend 28. At this time, the coil spring 264 acts to hold the leg 30 and the bend 28 together so that the leg 30, the bend 28 and the connecting member 254 may be aligned along the axis of the temple. To move the lenses 20 from their normal position to reading position, each of the legs 30 is downwardly pivoted about the pivot pin 262. This pivotal movement causes the rounded end 244 of the projection 242 to be disengaged from the lower edge 250 of the bend 28. The rounded end 244 is then moved along the inclined upper edge 252 of the bend 28 and finally, held between the upper edge 252 and the upper spacer 258. During this movement, the coil spring 264 is shortened to cause the leg 30 and the connecting member 254 to be moved toward the bend 28. This ensures tight holding of the lens frame against the nose of the user. It will be understood that reverse operation will return the lenses 20 to their normal position.

Figure 47:
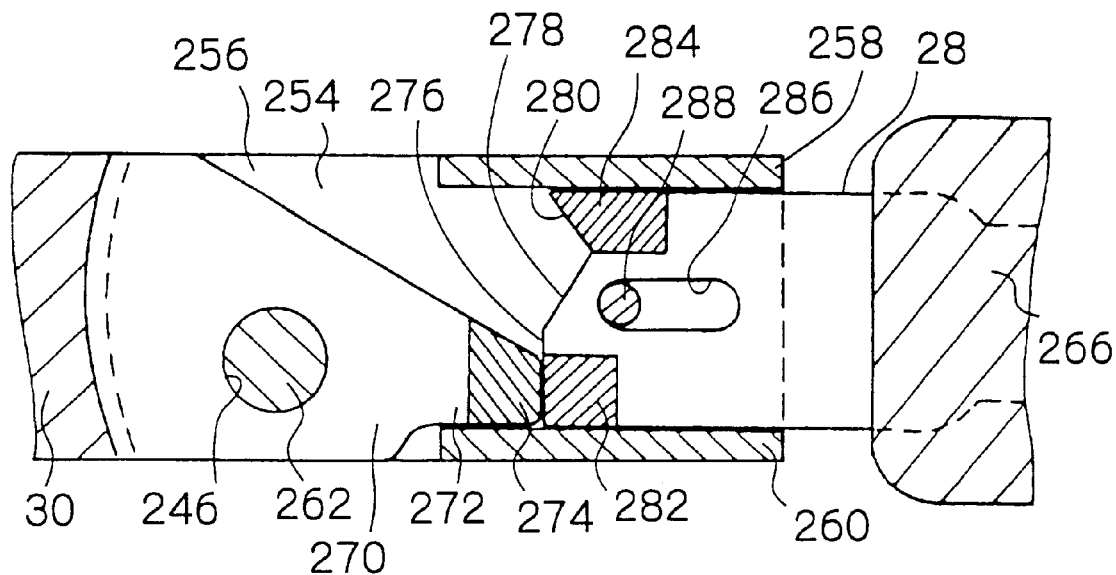
FIGS. 47 and 48 illustrate a sixteenth embodiment of the vertical plane adjusting mechanism according to the present invention.
Figure 48:
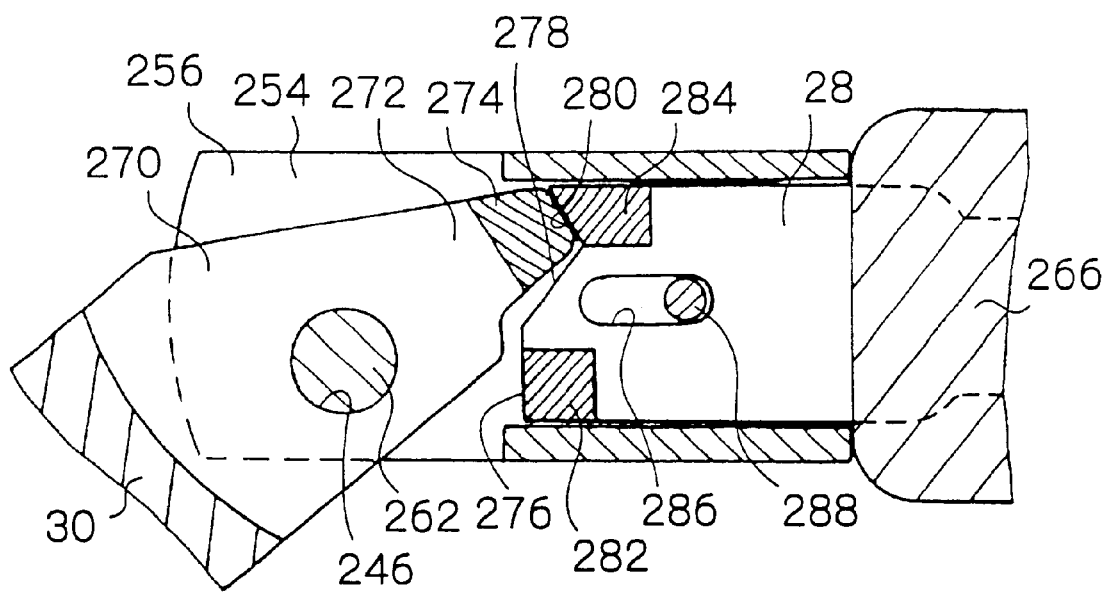

FIGS. 47 and 48 illustrate a sixteenth embodiment of the vertical plane adjusting mechanism according to the present invention and arranged between the legs 30 and the bends 28 of the temples 18. This embodiment is different from the embodiment shown in FIGS. 45 and 46 in that the coil spring is replaced by a set of magnets. Like parts thus are given like reference numerals used in FIGS. 45 and 46 and will not be described in detail herein.

Each of the legs 30 has a generally triangular projection 270 with a trapezoidal end 272. A magnet 274 is secured to the trapezoidal end 272 of the projection 270. The front end of the bend 28 has three edges, namely, a vertical lower edge 276, a rearwardly inclined intermediate edge 278 extending upwardly and rearwardly from the upper end of the lower edge 276, and a forwardly inclined upper edge 280 extending upwardly and forwardly from the upper end of the intermediate edge 278. A lower magnet 282 is fixedly secured to the lower edge 276 of the bend 28. Similarly, an upper magnet 284 is fixedly secured to the upper edge 280 of the bend 28. A horizontally extending guide slot 286 is defined in the front end of the bend 28. A pin 288 extends from one side of the plate 256 of the connecting member 254 and through the guide slot 286. A cover plate (not shown) may be secured to the upper and lower spacers 258, 260.

When the lenses (see FIG. 1) are in their normal position as shown in FIG. 47, the trapezoidal end 272 of the projection 270 rests on the lower spacer 260 with the magnet 274 magnetically attached to the magnet 282. At this time, the pin 288 is located in the front end of the guide slot 286. To move the lenses 20 from their normal position to reading position, each of the legs 30 is downwardly pivoted about the pin 262. This pivotal movement causes the trapezoidal end 272 of the projection 270 to be separated from the lower spacer 260 and moved toward the upper edge 280 of the bend 28. When the trapezoidal end 272 of the projection 270 reaches the upper edge 280 of the bend 28, the magnet 274 is magnetically attracted to the upper magnet 284 as shown in FIG. 48. During this movement, the leg 30 as well as the connecting member 254 is moved toward the bend 28 while the pin 288 is guided by the guide slot 286. It will be understood that reverse operation will return the lenses 20 to their normal position.

Figure 49:
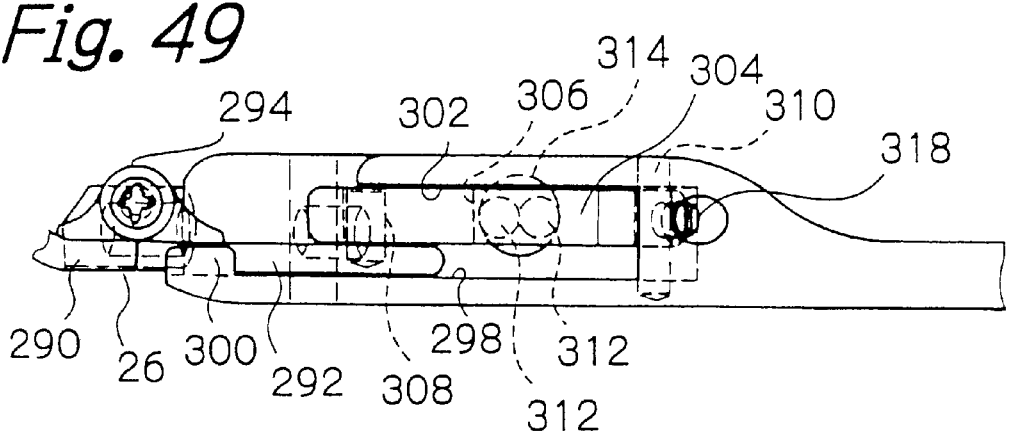
FIGS. 49 to 51 illustrate a seventeenth embodiment of the vertical plane adjusting mechanism according to the present invention.
Figure 50:
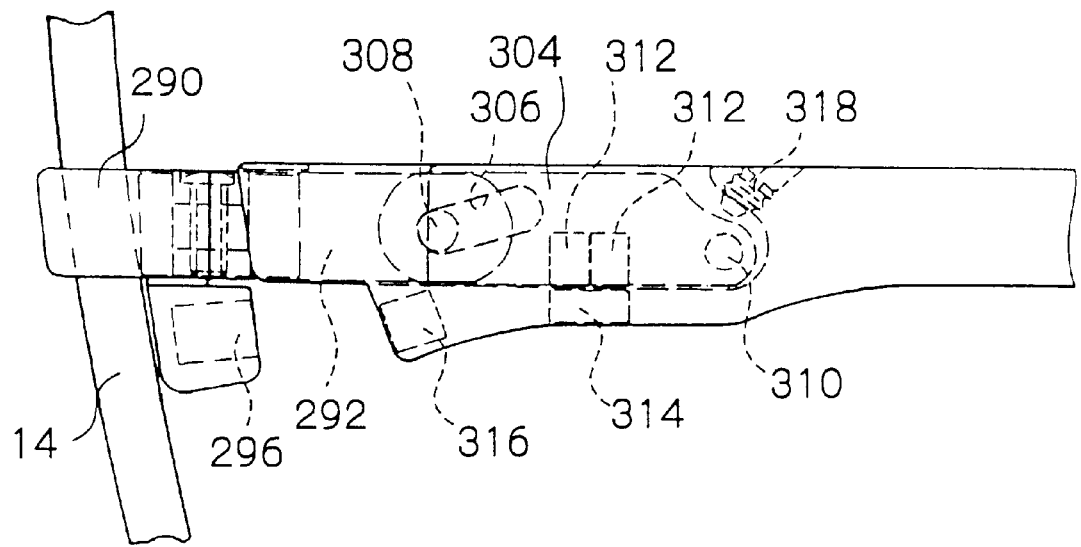
Figure 51:
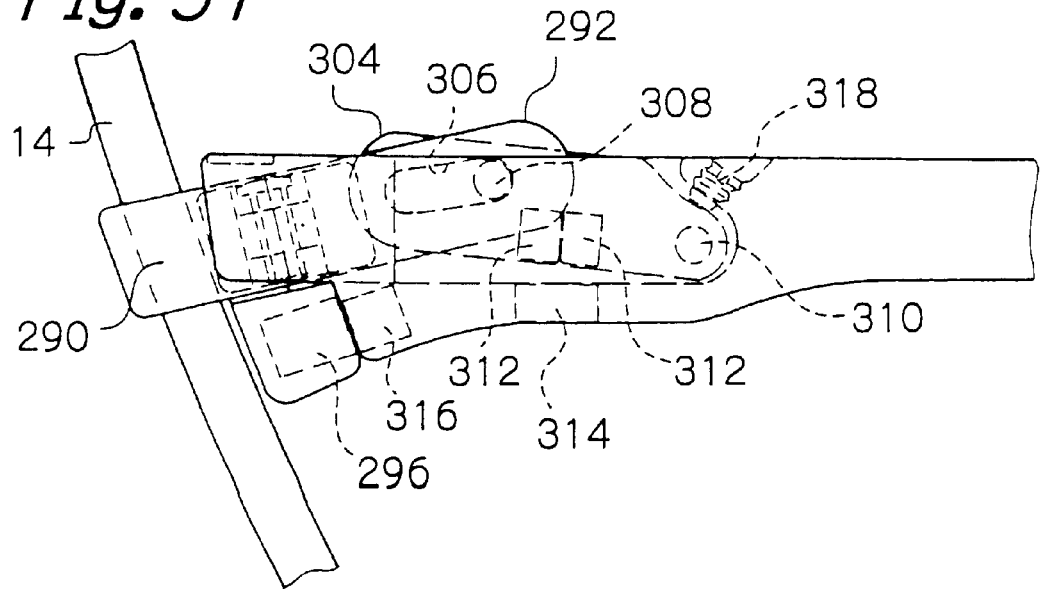

FIGS. 49 to 51 illustrate a seventeenth embodiment of the vertical plane adjusting mechanism according to the present invention and incorporated into the eyeglass frame. Specifically, a joint 26 has a front piece 290 secured to the rim 14, and a rear piece 292 having a length greater than that of the front piece 290. The rear pieces 292 of the joints 26 are pivotally connected to the front pieces 290 by hinges 294 (only one is shown), so that the temples can be folded across the nasal side of the lenses 20. A magnet 296 is fixedly mounted to the lower side of the joint 26. The leg 30 has a longitudinal groove 298 to receive the rear piece 292 of the joint 26. A pawl or stopper 300 extends laterally from the front end of the leg 30 so as to limit upward movement of the joint 26. A longitudinal groove 302 is also defined in the leg 30 and extends parallel to the groove 298. A generally ellipsoidal link 304 is received in the groove 302. The pivot link 304 has at its front end a slot 306 which is normally inclined with respect to the longitudinal axis of the leg 30. A lateral pin 308 extends from the rear end of the rear piece 202 of the joint 26 and is movable along the slot 306. The slot 306 and the pin 308 coact to allow pivotal movement between the joint 26 and the link 304. The leg 30 includes a lateral pin 310 which extends through the rear end of the link 304 to provide a pivotal connection between the link 304 and the leg 30. Two circular magnets 312 are secured to the lower side of the link 304. Also, a circular magnet 314 is secured to the lower side of the leg 30. Mounted adjacent to the magnet 314 is a magnet 316 positioned to be magnetically attached to the magnet 296. An adjusting screw 318 extends into the leg 30 so as to adjust angular movement of the pivot link 304.

When the lenses 20 (see FIG. 1) are in their normal position as shown in FIG. 50, the joint 26, the pivot link 304 and the leg 30 are aligned along the axis of the temple. At this time, the magnet 296 is separated from the magnet 316, whereas the magnets 312 are attached to the magnet 314. The pin 308 is located in the front end of the slot 306. To move the lenses 20 from their normal to reading position, the rim 14 and the joint 26 are pivoted downwardly about the pin 308. This pivotal movement causes the link 304 to be pivoted upwardly about the pin 310 as shown in FIG. 51. At this time, the magnet 296 is attached to the magnet 316, whereas the magnets 312 are separated from the magnet 314. During this movement, the joint 26 is moved toward the leg 30 so as to tightly hold the eyeglass frame against the nose of the user, as in the previous embodiments. It will be understood that reverse operation will return the lenses 20 to their normal position.

Figure 52:
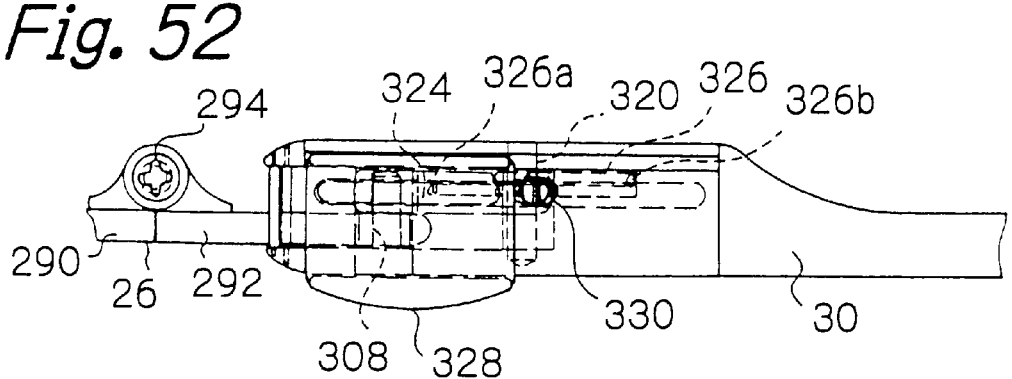
FIGS. 52 to 54 illustrate an eighteenth embodiment of the vertical plane adjusting mechanism according to the present invention.
Figure 53:
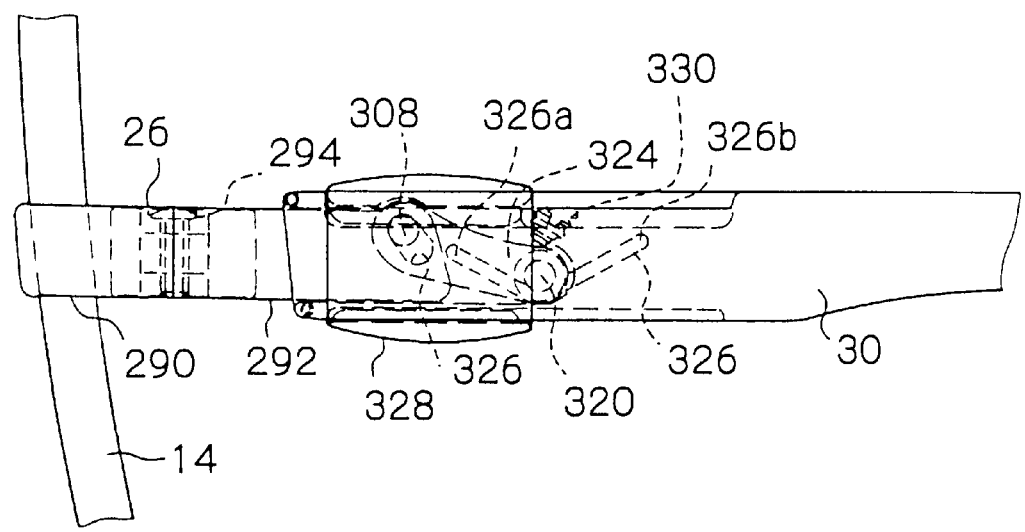
Figure 54:
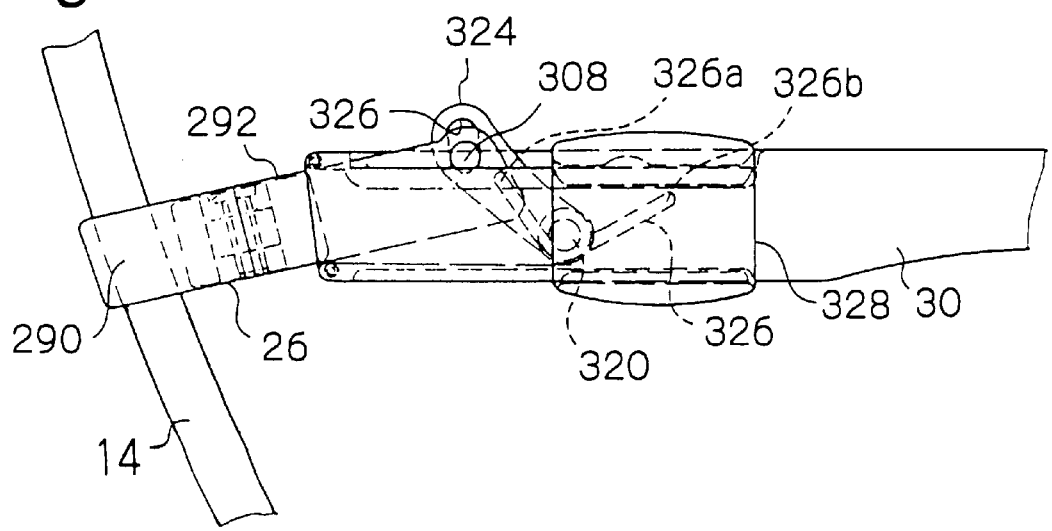

FIGS. 52 to 54 illustrate an eighteenth embodiment of the vertical plane adjusting mechanism according to the present invention and incorporated into the eyeglass frame 12. The components of the joint 26 are generally similar to those shown in FIGS. 49 to 51 and are given like reference numerals. The leg 30 has a lateral pin 320 which extends through a slightly arcuate pivot link 324. The pivot link 324 has at its front end a slot 326 through which the pin 308 extends. The pin 308 extends inwardly from one side of the rear piece 292 of the joint 26. A torsion spring 326 is mounted on the pin 320 so as to urge the front end of the link 324 in an upward direction. The spring 326 has a front end 326a connected to the pivot link 324 and a rear end 326b connected to the leg 30. A retainer or slide 328 is slidably moved on the leg 30. An adjusting screw 330 is held in contact with the link 324 so as to adjust angular movement of the link 324.

When the lenses 20 (see FIG. 1) are in their normal position as shown in FIGS. 52 and 53, the slide 328 is positioned at the front end of the leg 30 so as to limit upward movement of the pivot link 324. To move the lenses from their normal to reading position, the slide 328 is moved rearwards. This rearward movement permits the pivot link 324 to be upwardly pivoted about the pin 320 as shown in FIG. 54. At this time, the rim 14 and the joint 26 are moved toward the leg 30 while the joint 26 is downwardly pivoted about the pin 308. To return the lenses to their normal position, the slide 328 is advanced to cause the pivot link 324 to be downwardly pivoted about the pivot pin 320. As a result, the joint 26 and the rim 14 are returned to their original orientation as shown in FIG. 53.

Figure 55:
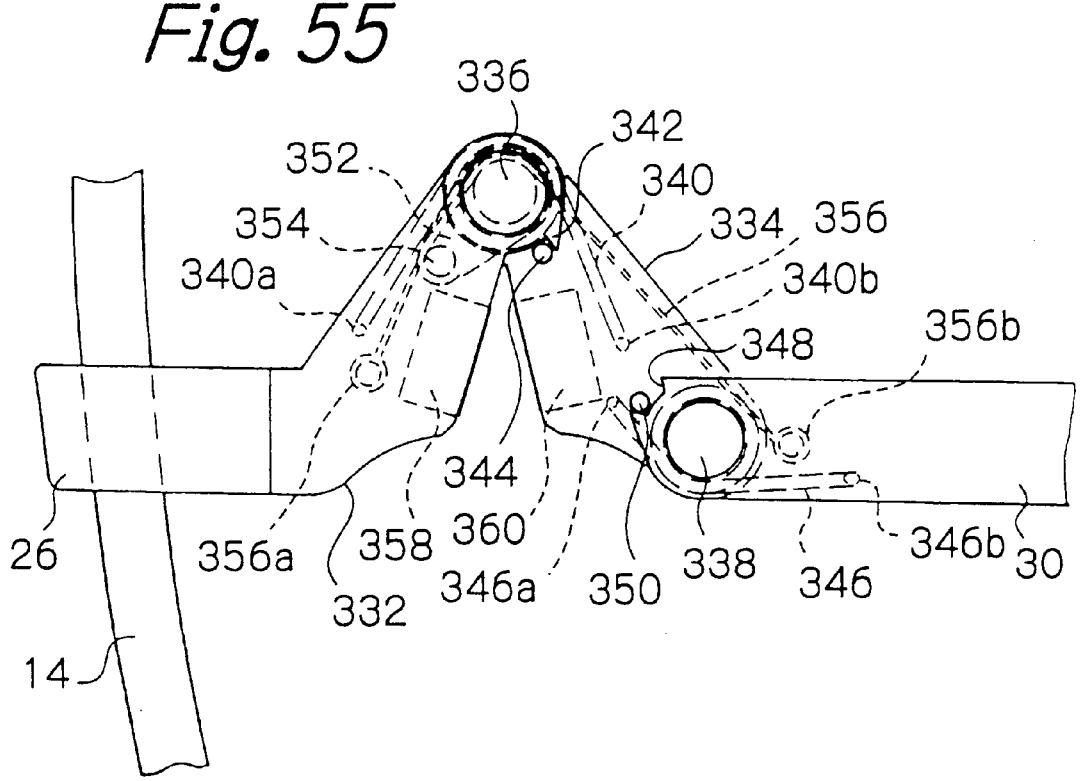
FIGS. 55 and 56 illustrate a nineteenth embodiment of the vertical plane adjusting mechanism according to the present invention.
Figure 56:
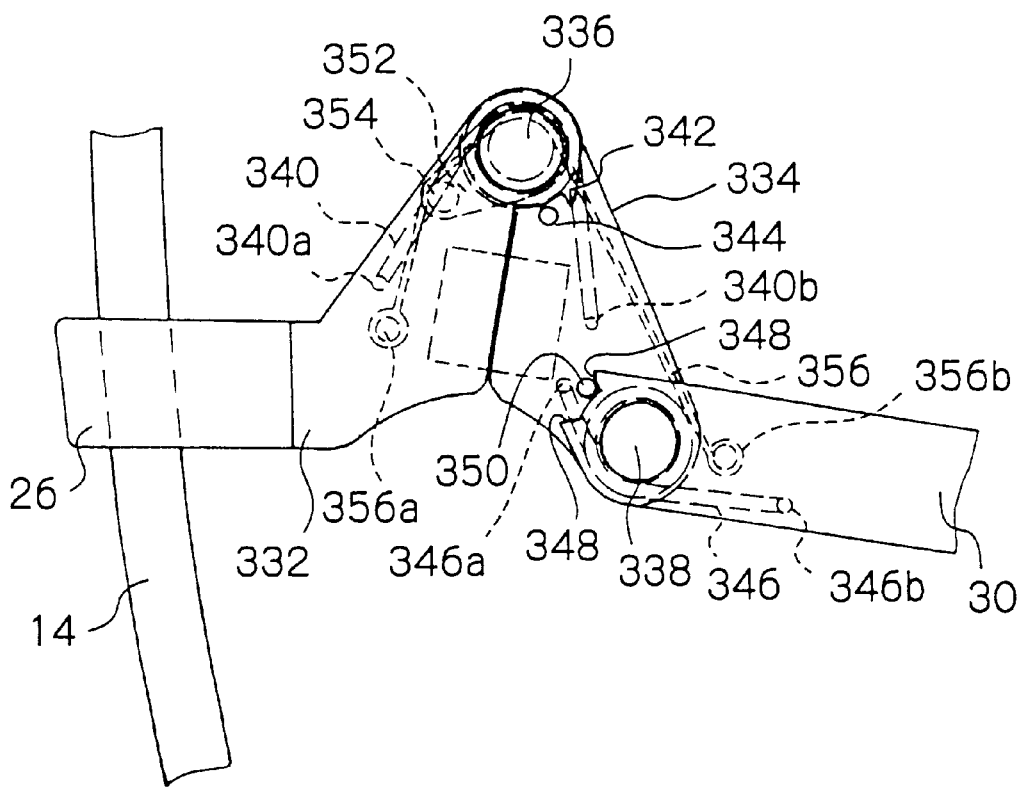

FIGS. 55 to 56 illustrate a nineteenth embodiment of the vertical plane adjusting mechanism according to the present invention and incorporated into the eyeglass frame 12. Specifically, each of the joints 26 has one end connected to the rim 14 and the other end formed integrally with an inclined projection 332. The free end of the projection 332 is pivotally connected to the front end of a pivot link 334 through a pin 336. The pivot link 334 is a mirror image of the projection 332. The rear end of the pivot link 334 is pivotally connected to the front end of the leg 30 through a pin 338. A torsion spring 340 is mounted centrally on the pin 336 and has a front end 340a connected to the projection 332 and a rear end 340b connected to the pivot link 334. The spring 340 acts to urge the projection 332 in an upward direction. A pawl 342 is formed on the rounded end of the projection 332 to define a step. A corresponding pin 344 extends from one side of the pivot link 334. The pin 344 is normally engaged with the pawl 342 so as to limit upward pivotal movement of the projection 332. Another torsion spring 346 is mounted centrally on the pin 338 and has a front end 346a connected to the pivot link 334 and a rear end 346b connected to the leg 30. A pair of pawls 348 are formed on the front end of the leg 30. A pin 350 extends from one side of the pivot link 334 and is positioned between the pawls 348 to limit angular movement of the pivot link 334. A cam 352 is connected to the pin 336. A pin 354 extends laterally from one end of the cam 352 opposite the pin 336. A wire 356 is engaged on the pins 336, 354 and has a front end 356a attached to the projection 332 and a rear end 356b attached to the leg 30. A magnet 358 and a magnet 360 are attached to the projection 332 and the pivot link 334, respectively.

When the lenses 20 (see FIG. 1) are in their normal position as shown in FIG. 55, the pivot link 334 is slightly forwardly inclined under the influence of the torsion spring 346, and the projection 332 is separated from the pivot link 334 under the influence of the torsion spring 340. To move the lenses 20 from their normal to reading position, the rim 14 and the joint 26 are downwardly pivoted about the pin 336 against the action of the springs 340, 346 until the magnet 358 is attached to the magnet 360 as shown in FIG. 56. At this time, the cam 352 is upwardly rotated relative to the projection 332 to pull the wire 356 forward. This causes slight upward pivoting of the temple about the ear of the user. With the lenses 20 in their elevated position, the joint 26 is bent relative to the leg 30 so that the lenses may be inclined at a proper angle with respect to a line of sight therethrough. In this embodiment too, the joint 26 and thus, the rim 14 are moved toward the leg 30 so as to hold the eyeglass frame 12 against the nose of the user when the projection 332 is moved toward the pivot link 334. It will be understood that reverse operation will return the lenses 20 to their normal position.

Figure 57:
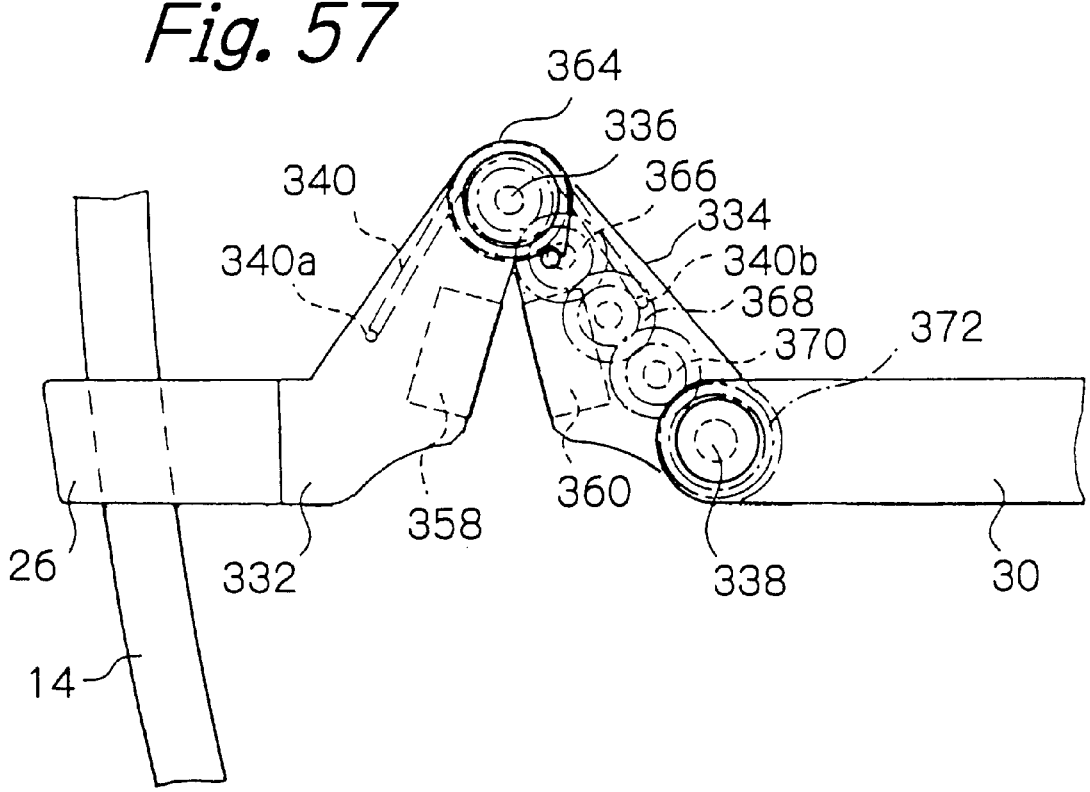
FIGS. 57 and 58 illustrate a twentieth embodiment of the vertical plane adjusting mechanism according to the present invention.
Figure 58:
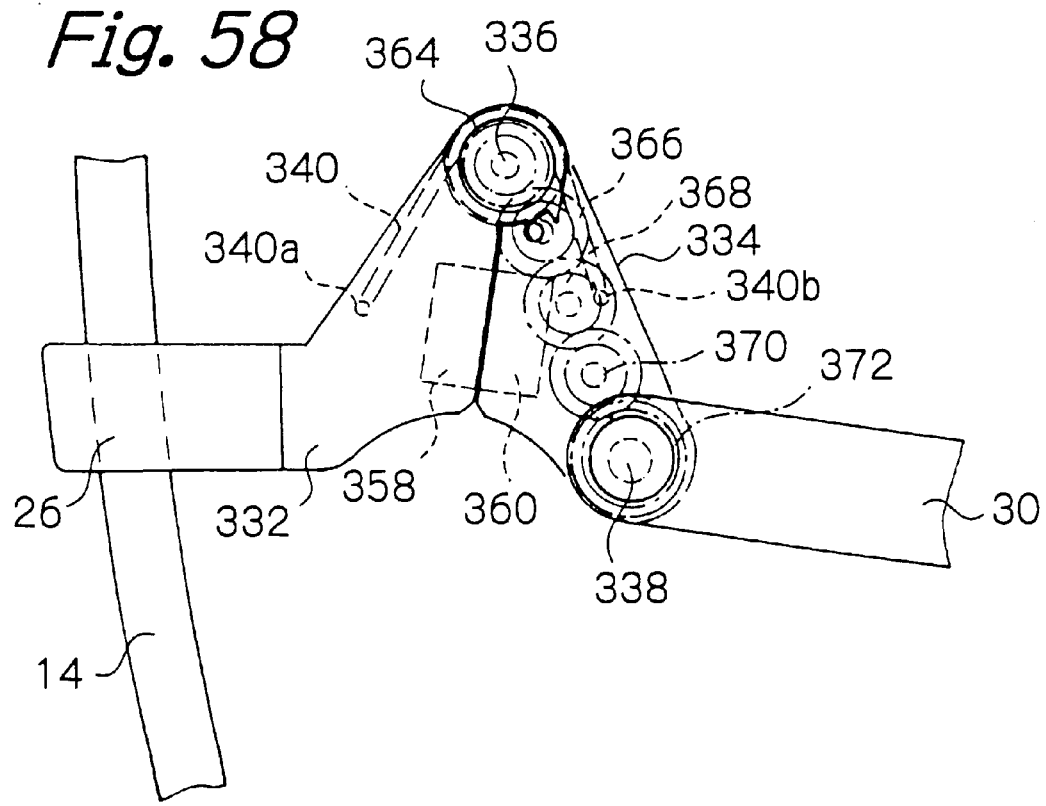

FIGS. 57 and 58 illustrate a twentieth embodiment of the vertical plane adjusting mechanism according to the present invention and incorporated into the eyeglass frame 12. This embodiment is different from the embodiment shown in FIGS. 55 and 56 in that the torsion spring 346 and the wire 356 are replaced by a set of gears. Like parts are thus given like reference numerals used in FIGS. 55 and 56 and will not be described in detail herein.

As shown, an upper gear 364 is mounted on the pin 336. A first intermediate gear 366 is mounted to the pivot link 334 and meshed with the upper gear 364. Similarly, a second intermediate gear 368 is mounted to the pivot link 334 and meshed with the upper gear 366. A third intermediate gear 370 is mounted to the pivot link 334 and meshed with the upper gear 368. A lower gear 372 is mounted on the pin 338 and meshed with the gear 370.

When the lenses 20 (see FIG. 1) are in their normal position as shown in FIG. 57, the torsion spring 340 urges the projection 332 in such a manner that the joint 332 and the leg 30 are aligned in the longitudinal direction of the temple. At this time, the magnet 358 is separated from the magnet 360. To move the lenses 20 from their normal to reading position, the rim 14 and the joint 26 are downwardly pivoted about the pin 336 against the action of the torsion spring 340 until the magnet 358 is attached to the magnet 360 as shown in FIG. 58. During this movement, the upper gear 364 is rotated in a counterclockwise direction. This rotary motion is transmitted through the gears 366, 368, 370 to the lower gear 372. The lower gear 372 is caused to rotate in the same direction as the upper gear 364. When the projection 332 is moved toward the link pivot 334, the joint 26 is bent relative to the leg 30. This causes the lenses to be inclined at a proper angle with respect to a line of sight therethrough. It will be understood that reverse operation will return the lenses to their normal position.

Figure 59:
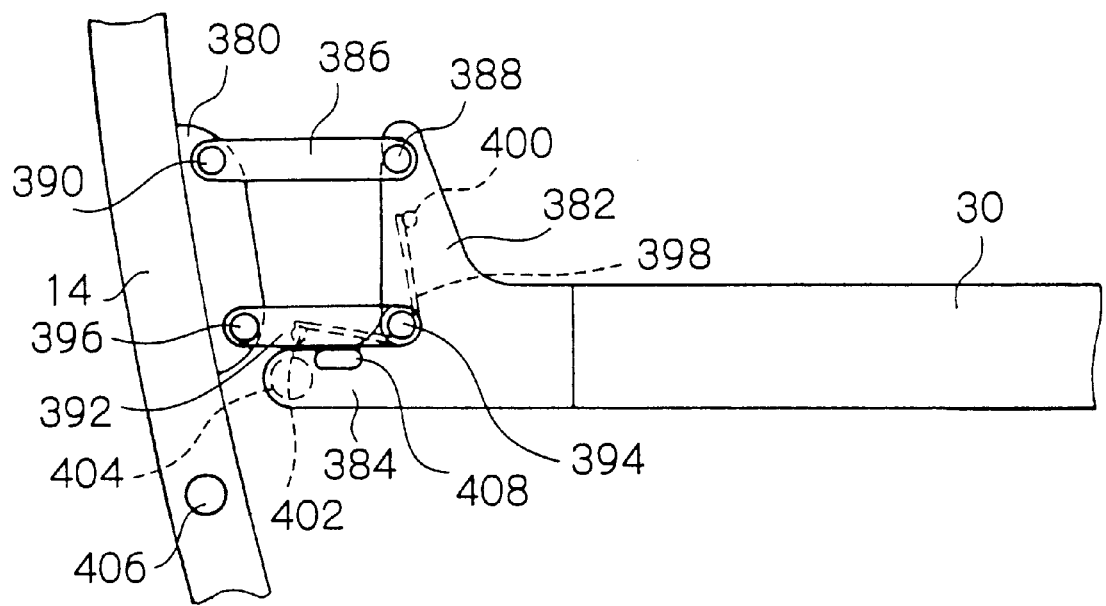
FIGS. 59 and 60 illustrate a twenty-first embodiment of the vertical plane adjusting mechanism according to the present invention.
Figure 60:
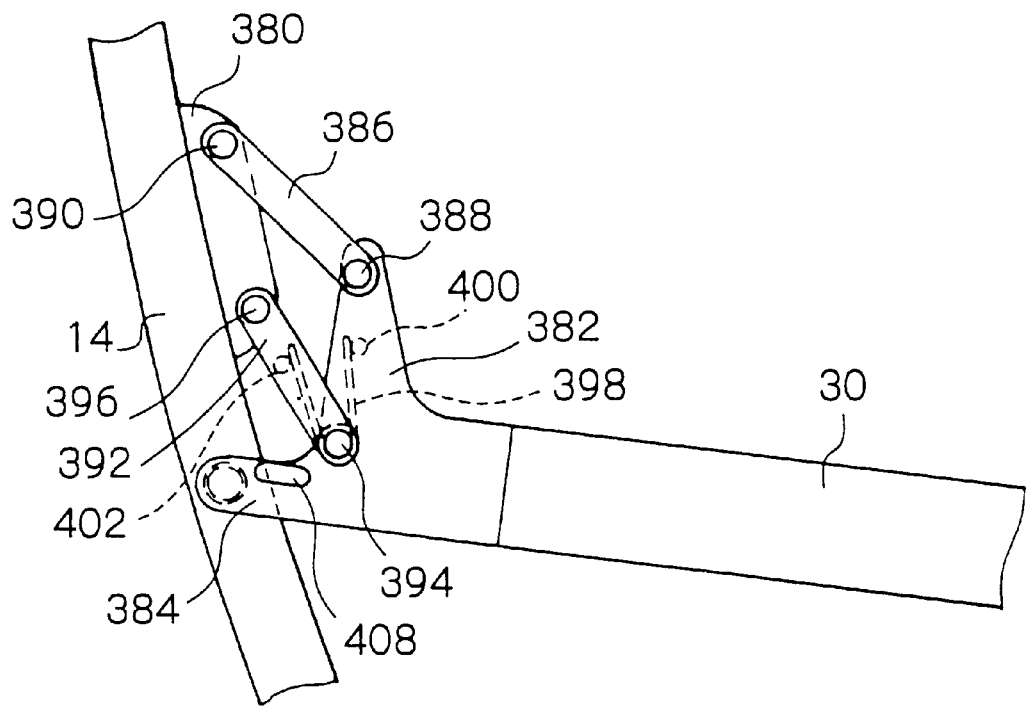

FIGS. 59 and 60 illustrate a twenty-first embodiment of the vertical plane adjusting mechanism according to the present invention and incorporated into the eyeglass frame 12. In this embodiment, a joint 380 is secured to and extends along the rim 14. The leg 30 has a vertical arm 382 and a horizontal arm 384. An upper link 386 has one end pivotally connected to the vertical arm 382 through a pin 388 and the other end pivotally connected to the upper end of the joint 380 through a pin 390. A lower link 392 has one end pivotally connected to the leg 30 between the two arms 382, 384 through a pin 394 and the other end pivotally connected to the lower end of the joint 380 through a pin 396. The lower link 392 is slightly shorter than the upper link 386. A torsion spring 398 is mounted centrally on the pin 394 and has one end connected as at 400 to the vertical arm 382 of the leg 30 and the other end connected as at 402 to the lower link 392. The spring 398 normally urges the joint 380 and the rim 40 in a downward direction through the lower link 392. The horizontal arm 384 is formed at its free end with a semispherical recess 404. The rim 14 has a corresponding semispherical protrusion 406. A stopper 408 is formed in the horizontal arm 384 of the leg 30.

When the lenses 20 (see FIG. 1) are in their normal position as shown in FIG. 59, the upper link 386 and the lower link 392 extend in parallel under the influence of the torsion spring 398, so that the rim 14 extends in a direction substantially perpendicular to the longitudinal axis of the leg 30. The lower link 392 is contacted with the stopper 408 so that downward movement of the lower link 392 is limited. To move the lenses from their normal to reading position, the rim 14 together with the joint 380 is downwardly pivoted through the links 386, 392 or inclined forward. This movement causes the links 386, 392 to be moved from their horizontal to vertical position. As a result, the joint 380 and thus, the rim 14 are moved toward the leg 30. When the lenses are held in their reading position as shown in FIG. 60, the projection 406 is received within the recess 404.

While the particular preferred embodiments of the present invention have been described and shown, it will be obvious to those skilled in the art that changes and modifications may be made without departing from the teachings of the invention. For example, in the embodiment shown in FIGS. 23 and 24, the fixed magnets 116, 188 may be secured to the joint 26, whereas the leg is provided with the movable magnet 108. In the embodiment shown in FIGS. 47 and 48, the vertical plane adjusting mechanism is arranged between the leg 30 and the bend 28. The mechanism may alternatively be incorporated between the joint 26 and the leg 30.

Figure 61:
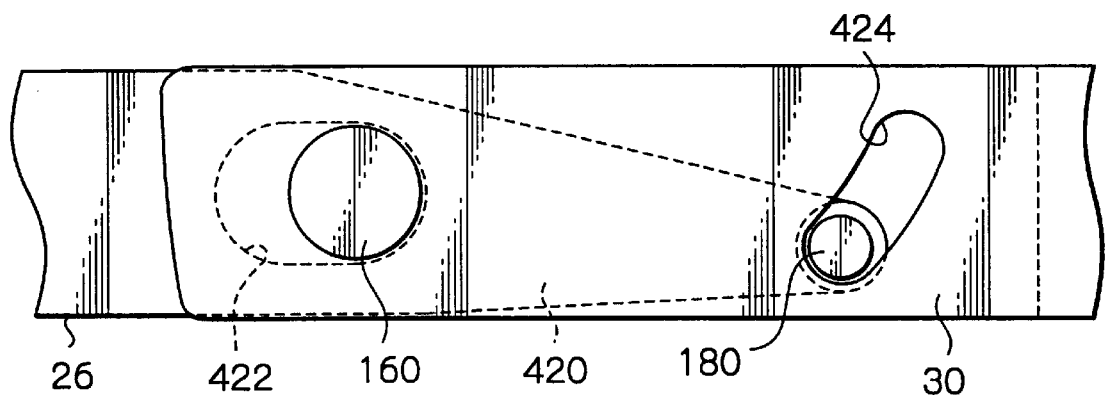
FIGS. 61 and 62 illustrate a twenty-second embodiment of the vertical plane adjusting mechanism according to the present invention.
Figure 62:
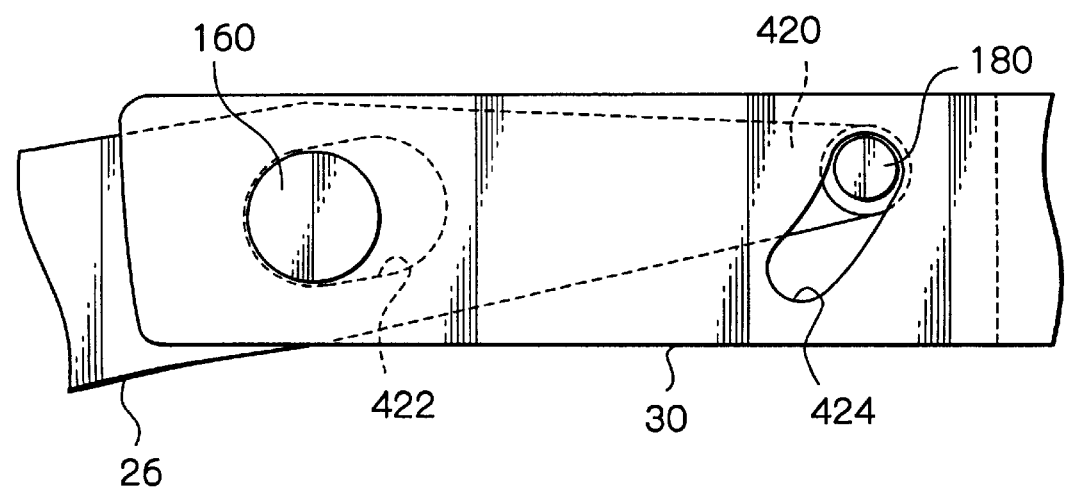

FIGS. 61 and 62 illustrate a twenty-second embodiment of the vertical plane adjusting mechanism according to the present invention. This embodiment is similar to that shown in FIGS. 35 and 36 and thus, like parts are given like reference numerals used therein. Specifically, the joint 26 has a triangular projection 420 in which an ellipsoidal slot 422 is formed. The pin 160 extends through the slot 422 to provide a pivotal connection between the joint 26 and the leg 30 as in the previous embodiments. The pin 180 extends laterally from the end of the projection 420 of the joint 26. An arcuate slot 424 is formed in the leg 30 to guide the pin 180. The slot 424 is bent rearwardly toward the ears of the user rather than forwardly from the face of the user as in the embodiment shown in FIGS. 35 and 36. The upper end of the arcuate slot 424 is located behind the lower end of the slot 424. The pins 160 and 180 are frictionally engaged within the respective slots 422 and 424 to reliably hold the joint 26 and the leg 30 together. This arrangement eliminates the need for a spring such as used in the embodiment shown in FIGS. 35 and 36.

When the lenses are in their normal position (see FIG. 1), the pins 180 are located in the lower end of the arcuate slots 424 as shown in FIG. 61. To move the lenses 20 from their normal to reading position, the joints 26 are pivoted downwardly about the respective pivot pins 160. This pivotal movement causes the pins 180 to be slidably moved toward the upper end of the arcuate slots 424 as shown in FIG. 62.

The present invention has been described with respect to its preferred embodiments. However, it is to be understood that various changes and modifications may be made without departing from the scope of the invention as defined by the appended claims.

What is claimed is:

1. A vertical plane adjusting mechanism for an eyeglass frame with a pair of rims in which a pair of corresponding multifocal lenses are mounted, said adjusting mechanism comprising a pair of temples, each of which including a first piece having one end secured to a corresponding one of said pair of rims and an other end, a second piece having one end connected to said other end of said first piece and an other end adapted to rest behind a wearer's ear, and means for enabling pivotal movement between said first and second pieces in a vertical plane so as to permit movement of the multifocal lenses between a normal position and an elevated position, said means being constructed to decrease the distance between a first point at which said one end of said first piece is connected to said rim and a second point at which said other end of said first piece is connected to said one end of said second piece when the lenses are moved from said normal position to said elevated position.

2. The adjusting mechanism of claim 1, wherein said first piece includes a movable magnet, and said second piece includes a lower fixed magnet and an upper fixed magnet, said movable magnet of said first piece being magnetically attached to said lower magnet of said second piece when the lenses are held in said normal position, and said movable magnet being magnetically attached to said upper magnet when the lenses are moved to said elevated position.

3. The adjusting mechanism of claim 1, wherein said first piece has an elongated slot, and said second piece has a pin movable within said elongated slot of said first piece when the lenses are moved between said normal position and said elevated position, said first piece having a projection at said other end thereof, and said second piece having upper and lower recesses in said one end thereof, said first piece including a fixed magnet located within said elongated slot and a movable magnet moved toward and away from said fixed magnet within said elongated slot, said fixed and movable magnets having like polarity, said projection of said first piece being received in said lower recess of said second piece when the lenses are held in said normal position and moved into said upper recess when the lenses are moved to said elevated position, said first piece being moved toward said second piece when the lenses are moved from said normal position to said elevated position.

4. The adjusting mechanism of claim 1, wherein said first piece has an elongated slot, and said second piece has a pin movable within said elongated slot of said first piece when the lenses are moved between said normal position and said elevated position, said first piece having a projection at said other end thereof, and said second piece having upper and lower recesses in said one end thereof, said upper recess having a depth greater than that of said lower recess, said first piece including an extendable element inserted between said pin and one end of said elongated slot, said extendable element being compressed to hold said projection in said lower recess when the lenses are held in said normal position, said extendable element being extended to move said first piece toward said second piece when the lenses are moved from said normal position to said elevated position.

5. The adjusting mechanism of claim 4, wherein said extendable element includes a coil spring.

6. The adjusting mechanism of claim 4, wherein said extendable element includes a bellows.

7. The adjusting mechanism of claim 1, wherein said first piece includes a pin, and said second piece includes a pin and a coil spring extending between said pin of said first piece and said pin of said second piece, said coil spring being compressed to thereby move said first piece toward said second piece when the lenses are moved from said normal position to said elevated position.

8. The adjusting mechanism of claim 1, further comprising a pivot link having one end connected to said one end of said second piece and an other end, said first piece including a rearwardly inclined projection connected to said other end of said pivot link, said projection including a magnet and said pivot link including a corresponding magnet having a polarity opposite to that of said magnet of said projection, said pivot link and said projection being urged in a direction away from each other when the lenses are held in said normal position, said projection being moved into contact with said pivot link with said magnets attacked to one another when the lenses are moved to said elevated position.

9. The adjusting mechanism of claim 1, further comprising an upper link and a lower link having a length less than that of said upper link, wherein said first piece is secured to and extending generally along said rim, said upper link having one end pivotally connected to said first piece and an other end pivotally connected to said second piece, and said lower link having one end pivotally connected to said first piece and an other end pivotally connected to said second piece, said upper and lower links extending substantially in parallel when the lenses are held in said normal position, said upper and lower links being so inclined as to move said first piece toward said second piece when the lenses are moved to said elevated position.

10. An eyeglass frame for multifocal lenses, said eyeglass frame comprising:
a pair of rims adapted to mount the respective multifocal lenses therein; and
a pair of temples connected to said pair of respective rims, each of said temples including a first piece having one end secured to a corresponding one of said pair of rims and an other end, a second piece having one end connected to said other end of said first piece and an other end adapted to rest behind a wearer's ear, and means for enabling pivotal movement between said first and second pieces in a vertical plane so as to permit movement of the multifocal lenses between a normal position and an elevated position, said means being constructed to decrease the distance between a first point at which said one end of said first piece is connected to said rim and a second point at which said other end of said first piece is connected to said one end of said second piece when the lenses are moved from said normal to said elevated position.

11. The eyeglass frame of claim 10, wherein said first piece includes a movable magnet, and said second piece includes a lower fixed magnet and an upper fixed magnet, said movable magnet of said first piece being magnetically attached to said lower magnet of said second piece when the lenses are held in said normal position, and said movable magnet being magnetically attached to said upper magnet when the lenses are moved to said elevated position.

12. The eyeglass frame of claim 10, wherein said first piece has an elongated slot, and said second piece has a pin movable within said elongated slot of said first piece when the lenses are moved between said normal position and said elevated position, said first piece having a projection at said other end thereof, and said second piece having upper and lower recesses in said one end thereof, said first piece including a fixed magnet located within said elongated slot and a movable magnet moved toward and away from said fixed magnet within said elongated slot, said fixed and movable magnets having like polarity, said projection of said first piece being received in said lower recess of said second piece when the lenses are held in said normal position and moved into said upper recess when the lenses are moved to said elevated position, said first piece being moved toward said second piece when the lenses are moved from said normal position to said elevated position.

13. The eyeglass frame of claim 10, wherein said first piece has an elongated slot, and said second piece has a pin movable within said elongated slot of said first piece when the lenses are moved between said normal position and said elevated position, said first piece having a projection at said other end thereof, and said second piece having upper and lower recesses in said one end thereof, said upper recess having a depth greater than that of said lower recess, said first piece including an extendable element inserted between said pin and one end of said elongated slot, said extendable element being compressed to hold said projection in said lower recess when the lenses are held in said normal position, said extendable element being extended to move said first piece toward said second piece when the lenses are moved from said normal position to said elevated position.

14. The eyeglass frame of claim 13, wherein said extendable element includes a coil spring.

15. The eyeglass frame of claim 13, wherein said extendable element includes a bellows.

16. The eyeglass frame of claim 10, wherein said first piece includes a pin, and said second piece includes a pin and a coil spring extending between said pin of said first piece and said pin of said second piece, said coil spring being compressed to thereby move said first piece toward said second piece when the lenses are moved from said normal position to said elevated position.

17. The eyeglass frame of claim 10, further comprising a pivot link having one end connected to said one end of said second piece and an other end, said first piece including a rearwardly inclined projection connected to said other end of said pivot link, said projection including a magnet and said pivot link including a corresponding magnet having a polarity opposite to that of said magnet of said projection, said pivot link and said projection being urged in a direction away from each other when the lenses are held in said normal position, said projection being moved into contact with said pivot link with said magnets attacked to one another when the lenses are moved to said elevated position.

18. The eyeglass frame of claim 10, further comprising an upper link and a lower link having a length less than that of said upper link, wherein said first piece is secured to and extending generally along said rim, said upper link having one end pivotally connected to said first piece and an other end pivotally connected to said second piece, and said lower link having one end pivotally connected to said first piece and an other end pivotally connected to said second piece, said upper and lower links extending substantially in parallel when the lenses are held in said normal position, said upper and lower links being so inclined as to move said first piece toward said second piece when the lenses are moved to said elevated position.

19. The eyeglass frame of claim 10, wherein said means for enabling pivotal movement comprises a pin through which said first and second pieces are pivotally connected, said first piece including an elongated slot through which said pin extends, and said first piece includes a second pin at said other end thereof, and said second piece includes an arcuate slot shaped to receive said second pin, said arcuate slot having a lower end and an upper end located behind said lower end of said arcuate slot with respect to said pair of rims.

20. The eyeglass frame of claim 19, wherein said arcuate slot is bent rearwardly toward the wearer's ear.

\* \* \* \* \*

UNITED STATES PATENT AND TRADEMARK OFFICE
CERTIFICATE OF CORRECTION

PATENT NO. : 6,183,080 B1  
DATED : February 6, 2001  
INVENTOR(S) : Tohru Negishi It is certified that error appears in the above-identified patent and that said Letters Patent is hereby corrected as shown below:

Title page,
Under Filing Date, please insert
-- PRIORITY DATA
  225098/1998  07/06/1998  (JP)
  285823/1998  09/02/1998  (JP)
  375357/1998  11/26/1998  (JP) --

Signed and Sealed this

Nineteenth Day of February, 2002

Attest:

Attesting Officer

JAMES E. ROGAN
Director of the United States Patent and Trademark Office